(12) United States Patent
Talda et al.

(10) Patent No.: US 11,708,219 B1
(45) Date of Patent: Jul. 25, 2023

(54) MOBILE, ROTATABLE, TRANSPORT MECHANISM WITH MULTIPLE CONVEYOR SECTIONS

(71) Applicant: Amazon Technologies, Inc., Seattle, WA (US)

(72) Inventors: Timothy Alan Talda, Renton, WA (US); Terin Thomas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 17/015,480

(22) Filed: Sep. 9, 2020

(51) Int. Cl.
| | | |
|---|---|---|
| *B65G 1/10* | (2006.01) | |
| *B65G 1/06* | (2006.01) | |
| *B65G 1/02* | (2006.01) | |

(52) U.S. Cl.
CPC .............. *B65G 1/10* (2013.01); *B65G 1/023* (2013.01); *B65G 1/026* (2013.01); *B65G 1/065* (2013.01)

(58) Field of Classification Search
CPC .......... B65G 1/10; B65G 1/023; B65G 1/026; B65G 1/065
See application file for complete search history.

(56) References Cited

U.S. PATENT DOCUMENTS

| | | | | |
|---|---|---|---|---|
| 1,896,604 A | * | 2/1933 | Bales | A47F 5/108 108/100 |
| 2,891,677 A | * | 6/1959 | Ritchie | A47F 1/12 211/151 |
| 3,827,376 A | * | 8/1974 | Solomon | A47B 43/00 108/177 |
| 3,894,634 A | * | 7/1975 | Gotham et al. | A47F 5/0093 211/186 |
| 4,372,451 A | * | 2/1983 | Rasmussen et al. | A47F 1/12 211/151 |
| 4,453,641 A | * | 6/1984 | Rasmussen et al. | B65G 1/08 211/151 |
| 5,295,591 A | * | 3/1994 | Slater | A47B 47/027 211/151 |
| 5,344,033 A | * | 9/1994 | Herman | A47B 57/04 108/6 |
| 5,590,796 A | * | 1/1997 | Herman | A47F 5/16 211/150 |
| 5,730,068 A | * | 3/1998 | Rioux, Jr. | A47F 5/10 108/92 |
| 5,735,661 A | * | 4/1998 | De Frondeville et al. | G07F 9/06 414/529 |

(Continued)

FOREIGN PATENT DOCUMENTS

| | | | |
|---|---|---|---|
| DE | 9317137 U1 * | 5/1994 | |
| FR | 2897854 A1 * | 8/2007 | A47F 1/12 |

*Primary Examiner* — Stanton L Krycinski
(74) *Attorney, Agent, or Firm* — Athorus, PLLC

(57) ABSTRACT

A mobile, rotatable, transport mechanism may include a rotating carrier having a plurality of conveyor sections. The rotating carrier may be moved within a facility by a robotic drive unit. In addition, the rotating carrier may be rotated between a vertical orientation for transport or storage, and a horizontal orientation for transfer of items or trays. A leveling mechanism may maintain the plurality of conveyor sections in a same relative orientation during rotation of the rotating carrier. Further, a height of the rotating carrier and/or angles of the plurality of conveyor sections may be adjusted to facilitate transfer of trays.

19 Claims, 15 Drawing Sheets

(56) References Cited

U.S. PATENT DOCUMENTS

| | | | | |
|---|---|---|---|---|
| 5,816,419 A * | 10/1998 | Lamson | ............. | A47B 57/045 248/242 |
| RE36,638 E * | 4/2000 | Herman | ............. | A47F 5/137 211/150 |
| 6,068,111 A * | 5/2000 | Smith et al. | ............. | B65G 13/12 193/35 TE |
| 6,132,158 A * | 10/2000 | Pfeiffer et al. | ......... | B65G 13/12 211/151 |
| 6,321,663 B1 * | 11/2001 | Rogers | ............. | A47B 57/04 211/195 |
| 6,675,946 B2 * | 1/2004 | Lutz | ............. | B65G 41/005 193/35 TE |
| RE38,517 E * | 5/2004 | Pfeiffer | ............. | B65G 1/023 211/151 |
| 6,948,900 B1 * | 9/2005 | Neuman | ............. | B65G 1/023 211/126.9 |
| 6,951,441 B2 * | 10/2005 | Weaver | ............. | B65G 1/023 211/151 |
| 7,090,064 B2 * | 8/2006 | Lutz | ............. | B65G 13/12 193/35 TE |
| 7,198,160 B2 * | 4/2007 | Ernst et al. | ............. | A47F 5/01 211/168 |
| 8,280,547 B2 * | 10/2012 | D'Andrea et al. | .... | G05D 1/0234 700/214 |
| 8,443,991 B1 * | 5/2013 | Ivey, III | ............. | A47B 51/00 211/116 |
| 8,893,902 B2 * | 11/2014 | Dotson et al. | ......... | B65G 1/023 211/151 |
| 9,008,829 B2 * | 4/2015 | Worsley | ............. | G05D 1/0297 700/214 |
| 9,008,830 B2 * | 4/2015 | Worsley | ............. | G05D 1/0291 700/216 |
| 9,044,106 B1 * | 6/2015 | Smith | ............. | G06K 9/6217 |
| 9,334,115 B2 * | 5/2016 | Bartelet | ............. | B65G 1/10 |
| 9,378,482 B1 * | 6/2016 | Pikler et al. | ......... | B65G 1/0492 |
| 9,420,900 B1 * | 8/2016 | Simpson et al. | ......... | B65G 1/08 |
| 9,492,923 B2 * | 11/2016 | Wellman et al. | ...... | B25J 9/1669 |
| 9,738,449 B1 * | 8/2017 | Palamarchuk et al. | .. | G05D 1/00 |
| 10,029,851 B1 * | 7/2018 | Durham et al. | ....... | B65G 1/1373 |
| 10,098,457 B2 * | 10/2018 | Gagne | ............. | A47B 85/06 |
| 10,676,279 B1 * | 6/2020 | Bidram et al. | ......... | A01G 9/143 |
| 10,817,849 B1 * | 10/2020 | Nicoll et al. | ............. | A47F 1/04 |
| 10,846,675 B1 * | 11/2020 | Smith | ............. | G07F 17/12 |
| 11,230,435 B1 * | 1/2022 | Mehta et al. | ............. | B65G 1/10 |
| 2005/0115809 A1 * | 6/2005 | Lutz | ............. | B65G 1/023 198/860.1 |
| 2008/0145197 A1 * | 6/2008 | Taylor et al. | ............. | B65G 1/023 414/276 |
| 2011/0103924 A1 * | 5/2011 | Watt et al. | ............. | B65G 37/02 414/800 |
| 2012/0217212 A1 * | 8/2012 | Czalkiewicz et al. | ... | A47F 1/12 211/59.2 |
| 2016/0176636 A1 * | 6/2016 | Kazama et al. | .. | G05B 19/41895 700/214 |
| 2016/0236869 A1 * | 8/2016 | Kimura et al. | ....... | B65G 1/1378 |
| 2019/0177086 A1 * | 6/2019 | Mathi et al. | ............. | B65G 1/10 |

* cited by examiner

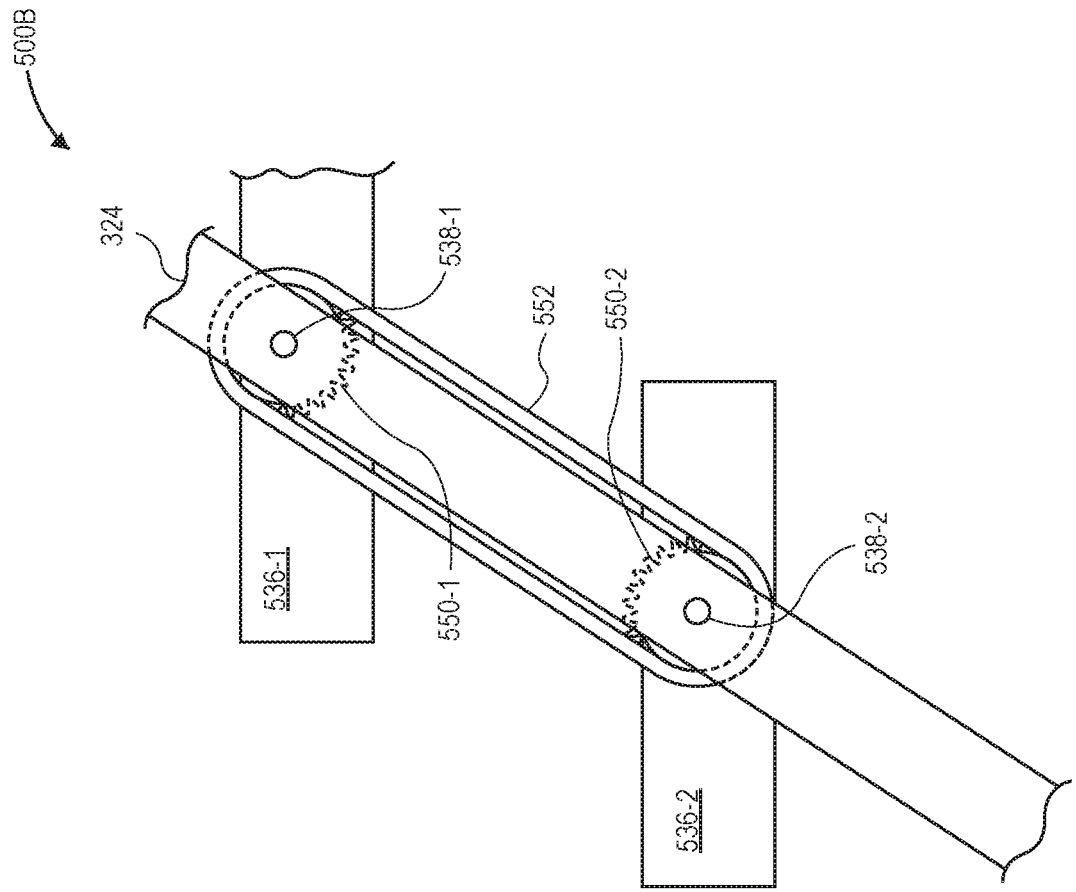
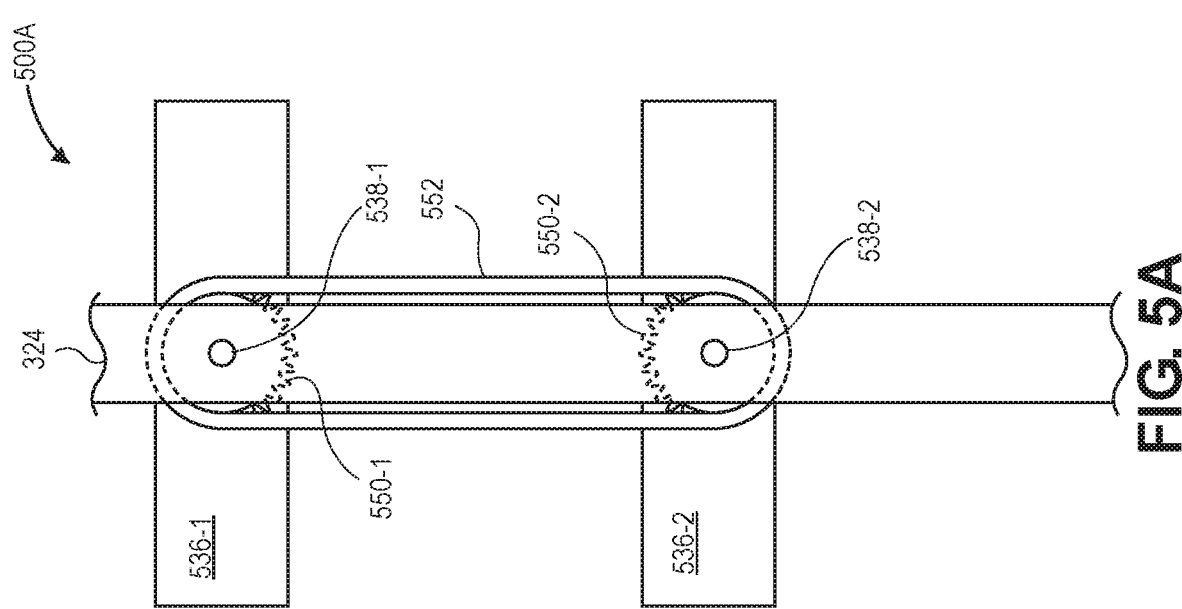
FIG. 5B
FIG. 5A

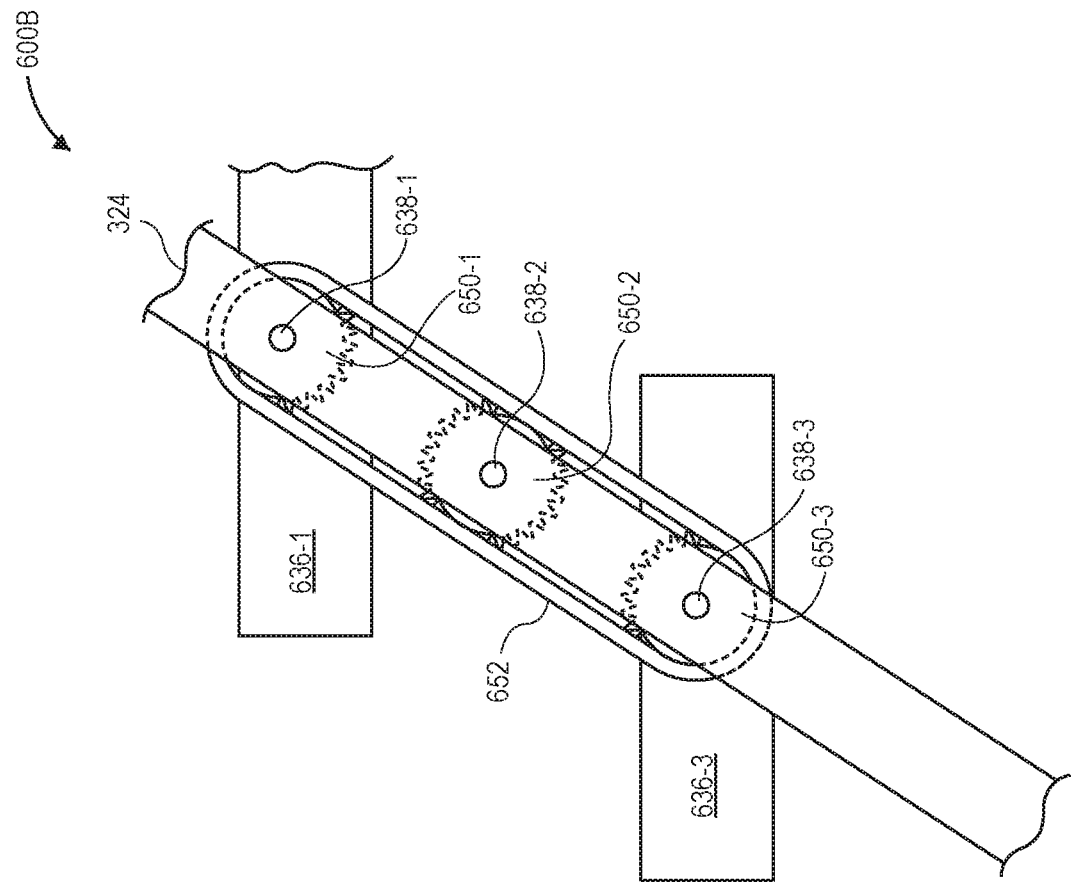
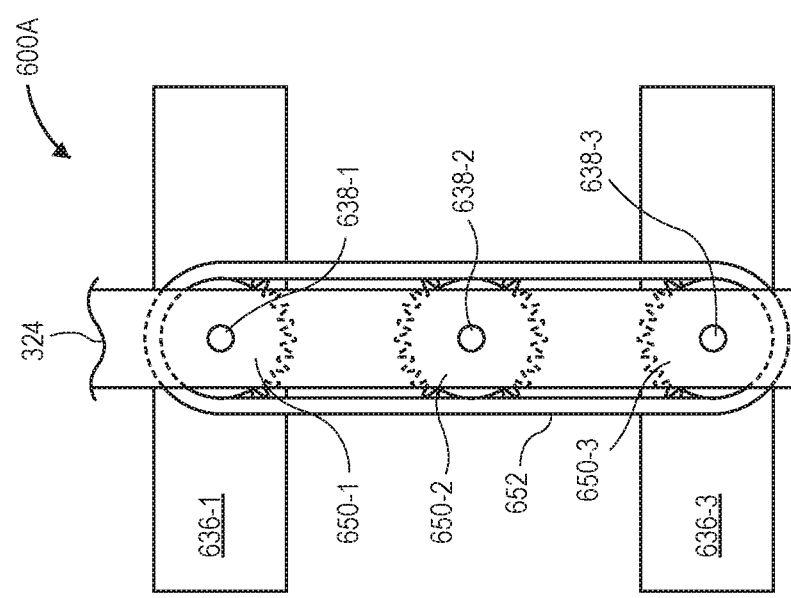
FIG. 6B
FIG. 6A

MOBILE, ROTATABLE, TRANSPORT MECHANISM WITH MULTIPLE CONVEYOR SECTIONS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

BRIEF DESCRIPTION OF THE DRAWINGS

FIGS. 5A and 5B are schematic, partial, side view diagrams showing multiple positions of a portion of another example mobile, rotatable, transport mechanism, in accordance with implementations of the present disclosure.

FIGS. 6A and 6B are schematic, partial, side view diagrams showing multiple positions of a portion of a further example mobile, rotatable, transport mechanism, in accordance with implementations of the present disclosure.

DETAILED DESCRIPTION

Figure 1:
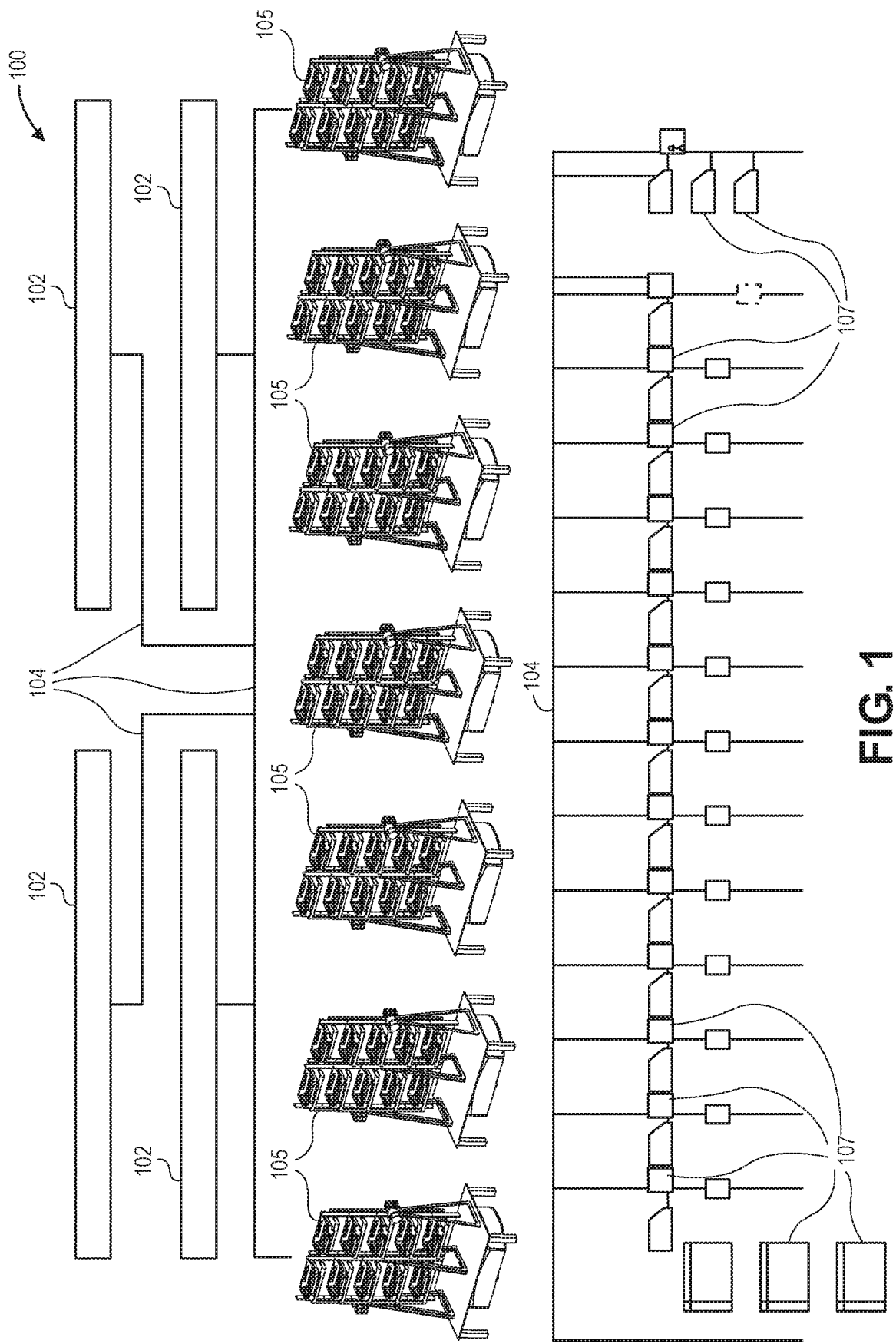
FIG. 1 is a schematic diagram of an example environment utilizing mobile, rotatable, transport mechanisms, in accordance with implementations of the present disclosure.

As is set forth in greater detail below, implementations of the present disclosure are directed to mobile, rotatable, transport mechanisms with multiple conveyor sections that may receive one or more items, trays, or totes and that may be moved between various stations or positions within an environment using one or more robotic drive units. The example mobile, rotatable, transport mechanisms described herein may be configured to improve the speed, flexibility, and adaptability of movement or transfer of items, trays, or totes within an environment, while also reducing capital cost, downtime, load imbalances, trapped or stuck items, and various other inefficiencies associated with fixed conveyance or material handling systems.

In example embodiments, the example mobile, rotatable, transport mechanisms may include one or more rotatable or rotating carriers coupled to a base and a frame. A rotatable carrier may include a plurality of conveyor sections that may be rotated relative to each other. The rotatable carrier may be rotated between a vertical orientation, e.g., during transport within an environment, a horizontal orientation, e.g., during transfer, loading, or unloading of items, trays, or totes with respect to the plurality of conveyor sections, and/or any other orientations. Each of the plurality of conveyor sections may be independently actuated, or may be collectively actuated, to transfer items, trays, or totes. Further, the entire transport mechanism may be engaged, lifted, moved, and/or placed using one or more robotic drive units, or may be fixed or mounted to a robotic drive unit.

In example embodiments, the plurality of conveyor sections of a rotatable carrier may also include a leveling mechanism, such as one or more linkages, geared mechanisms, pulley connections, or similar structures, to maintain each of the plurality of conveyor sections substantially horizontally flat to support items, trays, or totes received thereon during rotation of the rotatable carrier between the vertical orientation, the horizontal orientation, and/or any other orientations. In some example embodiments, the leveling mechanism may operate substantially passively to maintain the plurality of conveyor sections in a same relative orientation, while in other example embodiments, the leveling mechanism may be actuated in order to actively control angles of the plurality of conveyor sections.

In additional example embodiments, the frame to which a rotatable carrier is coupled may also include a height adjustment mechanism to modify or adjust a vertical height of the rotatable carrier as a whole. For example, the vertical height of the rotatable carrier may be at a first vertical height during transport in the vertical orientation, and the vertical height of the rotatable carrier may be modified or adjusted to a second vertical height in the horizontal orientation, in order to align with various stations, conveyors, or other processes during transfer, loading, or unloading of items, trays, or totes.

In further example embodiments, one or more example transport mechanisms may be utilized to form a temporary conveyor or conveyance mechanism within an environment. For example, one or more example transport mechanism may be moved to positions within the environment and rotated to respective horizontal orientations in order to operate as a temporary conveyor between two or more stations, conveyors, or other processes. In this manner, the example transport mechanisms may be utilized to form on-demand conveyance systems of variable shape, size, number, configuration, or arrangement as needed depending upon transport and processing requirements associated with the environment.

In still further example embodiments, a primary rotatable carrier that is coupled to a frame of an example transport mechanism may include one or more nested rotatable carriers therein, such that two more nested conveyor sections of a nested rotatable carrier may rotate relative to the primary rotatable carrier, and relative to one or more primary conveyor sections associated with the primary rotatable carrier. In this manner, items, trays, or totes received by individual conveyor sections of the example transport mechanism may be rearranged, reordered, or sorted, e.g., when stationary and/or during movement of the example transport mechanism, in order to provide greater flexibility with respect to an order or sequence of transfer, loading, or unloading of items, trays, or totes with respect to the example transport mechanism.

Using the example mobile, rotatable, transport mechanisms described herein, items, trays, totes, bins, containers, or other groups of items may be transported flexibly and on-demand between any two or more positions within an environment. Further, the transfer, e.g., loading or unloading, of items, trays, or totes between any two or more positions may be performed without need for further equipment, machinery, apparatus, robotic devices or arms, or other operators or associates, by aligning the actuatable conveyor sections of the example mobile, rotatable, transport mechanisms described herein with portions of fixed conveyance or material handling equipment or systems that may be present at various positions within an environment.

FIG. 1 is a schematic diagram 100 of an example environment utilizing mobile, rotatable, transport mechanisms, in accordance with implementations of the present disclosure.

The example environment may comprise a warehouse, storage facility, sort facility, distribution center, material handling facility, or any other type of facility or building. As shown in FIG. 1, the environment may include one or more stations 102, e.g., object, item, tray, tote, bin, or other container processing stations, that may be operatively connected within the environment via one or more fixed conveyance or material handling equipment or systems 104. For example, the one or more stations 102 may receive, decant, stow, sort, separate, consolidate, or otherwise process one or more items, products, or other objects and place them in trays, totes, bins, packages, or other containers, and the one or more fixed conveyance systems 104 may generally transport the items, trays, totes, bins, containers, packages, products, or other objects that may be received by the example mobile, rotatable, transport mechanisms 105 described herein. The one or more objects may comprise various items, products, packages, and/or containers or groups of objects, e.g., books, electronics, grocery, apparel, or various other types of items.

In addition, one or more example mobile, rotatable, transport mechanisms 105 may be substantially freely movable within the environment between various transfer positions that may be associated with the one or more stations 102 and/or the one or more fixed conveyance systems 104, which may generally comprise upstream stations or processes. At each transfer position, one or more items, trays, totes, bins, or other containers may be transferred between an example transport mechanism 105 and a station, conveyor, or other process associated with the environment. For example, a tray may be loaded onto the example transport mechanism 105 from an upstream station, conveyor, or process.

Further, the environment may also include one or more stations 107, e.g., item, tray, tote, bin, or other container processing stations, that may also be operatively connected within the environment via one or more fixed conveyance or material handling equipment or systems 104. For example, the one or more fixed conveyance systems 104 may generally transport the items, trays, totes, bins, or other containers that may be received from the example mobile, rotatable, transport mechanisms 105 described herein, and the one or more stations 107 may sort, separate, consolidate, pack, ship, or otherwise process one or more items from the trays, totes, bins, or other containers for various downstream processes.

In this regard, the one or more example mobile, rotatable, transport mechanisms 105 may also be substantially freely movable within the environment between various transfer positions that may be associated with the one or more stations 107 and/or the one or more fixed conveyance systems 104, which may generally comprise downstream stations or processes. At each transfer position, one or more items, trays, totes, bins, or other containers may be transferred between an example transport mechanism 105 and a station, conveyor, or other process associated with the environment. For example, a tray may be unloaded off the example transport mechanism 105 to a downstream station, conveyor, or process.

In example embodiments, the example transport mechanisms 105 illustrated in FIG. 1 may generally replace fixed conveyance or material handling equipment or systems that may conventionally extend between and operatively connect one or more upstream stations 102 with one or more downstream station 107, thereby improving the speed, flexibility, and adaptability of movement or transfer of items within an example environment, while also reducing capital cost, downtime, load imbalances, trapped or stuck items, and various other inefficiencies associated with fixed conveyance or material handling systems.

Although FIG. 1 illustrates a particular number, configuration, and arrangement of stations, fixed conveyance systems, and example transport mechanisms within the example environment, in other example embodiments, various other numbers, configurations, and arrangements of the stations, fixed conveyance systems, and example transport mechanisms may be utilized within an environment. For example, in additional example embodiments, all or substantially all of the fixed conveyance systems 104 may be removed from the example environment shown in FIG. 1, and the example transport mechanisms 105 may perform all or substantially all of the transfer and transport operations between various stations 102, 107 within the environment. In further example embodiments, the various stations 102, 107 may be rearranged or reconfigured within the environment in order to improve or optimize processing operations utilizing transfer and transport operations via the example transport mechanisms 105 in place of the fixed conveyance systems 104. Moreover, various numbers of example transport mechanisms 105 may be deployed within an environment based on transfer, transport, and/or processing requirements associated with the items, trays, stations, or other processes within the environment. Furthermore, the example transport mechanisms 105 may be utilized to transfer and transport items, trays, or other containers of items between any two or more transfer positions within an environment, regardless of the particular processing operations associated such transfer positions or various upstream or downstream stations or processes, which may include various material handling equipment, conveyance equipment, robotic arms or manipulators, automated systems or machinery, manual or semi-automated processes, and/or other equipment, stations, or processes.

Figure 2:
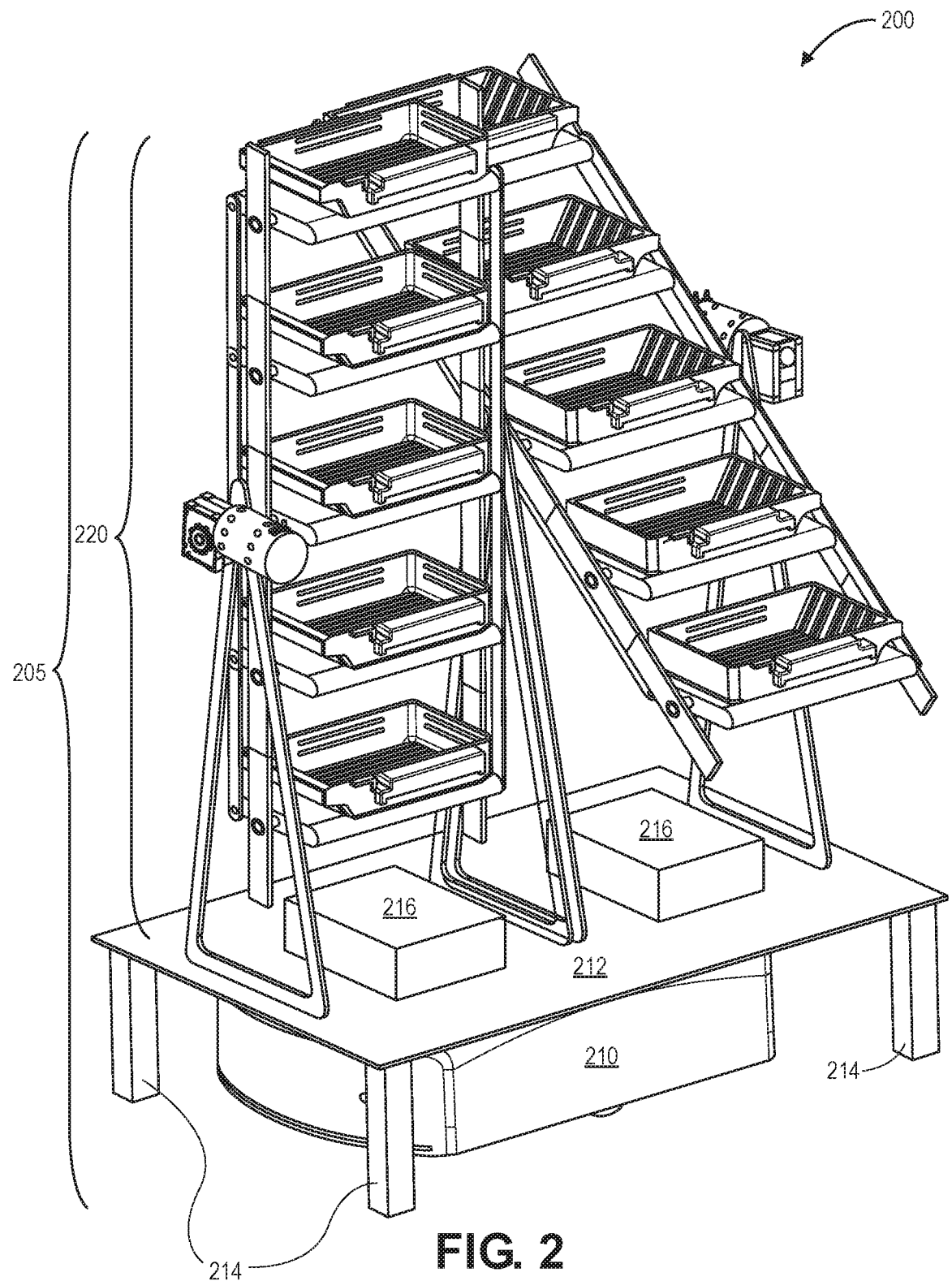
FIG. 2 is a schematic, perspective view diagram of an example mobile, rotatable, transport mechanism, in accordance with implementations of the present disclosure.

FIG. 2 is a schematic, perspective view diagram 200 of an example mobile, rotatable, transport mechanism, in accordance with implementations of the present disclosure. The example mobile, rotatable, transport mechanism 205 shown in FIG. 2 may be an example of the example transport mechanisms 105 shown in FIG. 1.

As shown in FIG. 2, an example mobile, rotatable, transport mechanism 205 may include a robotic drive unit 210, a base 212 including a plurality of legs 214, one or more power sources or controllers 216 (such as the control system described with respect to FIG. 12), and one or more rotatable or rotating carriers 220 that may be coupled to the base 212. The rotating carriers 220 are further described herein at least with respect to FIG. 3.

The robotic drive unit 210 may include a lift mechanism and a controller (such as the control system described with respect to FIG. 12), that may include a processor, a drive mechanism controller, a power supply, a memory, a lift mechanism controller, and a network interface or communication device. In example embodiments, the lift mechanism may comprise screw drives, geared mechanisms, linear actuators, or other actuators or mechanisms configured to cause vertical movement of a portion of the robotic drive unit 210 and to engage and lift a base 212 of an example transport mechanism 205.

In example embodiments, the robotic drive unit 210 may releasably engage or couple to respective bases 212 of transport mechanisms, such that the robotic drive unit 210 may perform various tasks, such as coupling to, lifting, moving, lowering, placing, and uncoupling from respective bases 212 of transport mechanisms as desired. For example, in order to engage and move a respective base 212 and transport mechanism, a robotic drive unit 210 may position itself underneath the base 212. Then, the lift mechanism may move vertically to engage with an underside of the base 212 and lift the base 212 and transport mechanism. While the base 212 and transport mechanism is lifted via the lift mechanism, the robotic drive unit 210 may move or transport the base 212 and transport mechanism between various portions of an environment, e.g., between various transfer positions within the environment. Upon reaching a desired location or position for the transport mechanism, the lift mechanism may again move vertically to disengage with the underside of the base 212 and lower the base 212 and transport mechanism.

In other example embodiments, a robotic drive unit 210 may be fixedly coupled or mounted to a respective base 212 and transport mechanism, such that the robotic drive unit 210 may perform various tasks, such as lifting, moving, and lowering the fixedly coupled or mounted base 212 and transport mechanism as desired. In this manner, the robotic drive unit 210 may move or transport the fixedly coupled or mounted base 212 and transport mechanism between various portions of an environment, e.g., between various transfer positions within the environment.

In addition, the robotic drive unit 210 may be in communication with a control system associated with the environment (such as the control system described with respect to FIG. 13), that may be configured to send and/or receive commands, instructions, and/or data to control and coordinate operations of the robotic drive unit 210, as well as other portions of the environment, such as movements between transfer positions associated stations, conveyors, or other processes, and/or various other movements. Further, the robotic drive unit 210 may move relative to various locations within the environment based in part on fiducial markers, e.g., barcodes, QR (quick response) codes, characters, symbols, radiofrequency (RFID) tags, or other identifiers, on the floors, surfaces, or regions adjacent to stations, conveyors, or other processes that are detected by one or more sensors of the robotic drive unit 210. Example sensors configured to detect fiducial markers may comprise imaging sensors, infrared sensors, RFID readers, or other types of sensors.

In other example embodiments, one or more imaging sensors may also be associated with various positions or locations within the environment, such that imaging data captured by such imaging sensors may be processed to detect various robotic drive units and their respective locations, with or without reference to fiducial markers or identifiers associated with particular locations. In additional example embodiments, one or more laser sensors, photoeyes, proximity sensors, radio transmitters and/or receivers, radio beacons, or other types of presence detection sensors may be associated with various positions or locations within the environment, such that presence detection data captured by such sensors may be processed to detect various robotic drive units at particular locations, with or without reference to fiducial markers or identifiers associated with particular locations. In further example embodiments, robotic drive units may include motor or wheel encoders associated with drive mechanisms that are configured to measure or detect rotations of motors and/or wheels, in order to determine movements and locations of robotic drive units based on dead reckoning by processing rotation data measured by such encoders. In still further example embodiments, one or more RFID tags may be associated with particular locations within the environment, and RFID readers associated with robotic drive units may detect RFID tags to determine respective locations of robotic drive units, and/or conversely, one or more RFID tags may be associated with particular robotic drive units, and RFID readers associated with various locations within the environment may detect RFID tags to determine respective locations of robotic drive units. Various other types of sensors, as well as combinations of two or more different types of sensors, may be used to measure, detect, and determine movements and locations of robotic drive units within the environment, in order to control and coordinate, e.g., by a controller, operations of robotic drive units within the environment.

In other example embodiments, the robotic drive unit 210 may have various other shapes, sizes, configurations, or arrangements. For example, in some example embodiments, the lift mechanism may include a self-centering configuration or mechanism, such that any base and transport mechanism that is lifted by the lift mechanism may be automatically centered with respect to the robotic drive unit 210. Various other types of lift mechanisms may also be included in the robotic drive unit 210 described herein.

In addition, as shown in FIG. 2, the base 212 and the plurality of legs 214, e.g., four legs, of an example transport mechanism 205 may have a substantially rectangular prism shape. The base 212 may be a substantially flat surface or plate on an upper surface of which is coupled one or more rotating carriers 220, and the one or more rotating carriers 220 may be coupled to the base 212 via fasteners, welds, brackets, and/or various other permanent, semi-permanent, or releasable connections. Further, the base 212 and the plurality of legs 214 may be formed from various materials, such as metals, plastics, composites, other materials, or combinations thereof.

Spacing between adjacent legs 214 of the base 212 may be sufficient to enable movement of a robotic drive unit 210 under the base 212, and an underside of the base 212 may be configured to be engaged by a lift mechanism of a robotic drive unit 210 to lift, move, and place the base 212 and transport mechanism. Moreover, the engagement between the lift mechanism of a robotic drive unit 210 and the base 212 of a transport mechanism 205 may comprise electrical, power, and/or data connections between the robotic drive unit 210 and the transport mechanism 205.

Furthermore, in example embodiments, one or more power sources or controllers 216 may be coupled to the base 212, e.g., an upper surface of the base. The power sources or controllers 216 may provide power to the transport mechanism 205 and/or the robotic drive unit 210. In addition, the power sources or controllers 216 may send and/or receive commands, instructions, and/or data between the transport mechanism 205, the robotic drive unit 210, and/or a control system associated with the environment (such as the control system described with respect to FIG. 13). In other example embodiments, the one or more power sources or controllers 216 coupled to the base 212 may not be provided, and instead, one or more power sources and/or controllers associated with the robotic drive unit 210 (such as the control system described with respect to FIG. 12), may be operatively connected to the transport mechanism 205 via engagement with the base 212 to provide electrical, power, and/or data connections between the transport mechanism 205, the robotic drive unit 210, and/or a control system associated with the environment.

In addition, as shown in FIG. 2, the rotating carriers 220 coupled to an upper surface of a base 212 of an example transport mechanism 205 may have a substantially triangular or A-frame shape. The rotating carriers 220 may comprise one or more frames having a plurality of beams, poles, struts, columns, or other structures that are coupled to the base, e.g., via fasteners, welds, brackets, and/or various other permanent, semi-permanent, or releasable connections, and that support the rotating carriers and associated conveyor sections. In other example embodiments, the frames of the rotating carriers 220 may have other shapes or configurations, such as rectangular, box, single beam, multiple beams, parallel beams, or other shapes, as long as the frames provide structural support to the rotating carriers and associated conveyor sections. Further, the rotating carriers 220 may be formed from various materials, such as metals, plastics, composites, other materials, or combinations thereof.

Although FIG. 2 illustrates a particular number, configuration, and arrangement of a robotic drive unit, base, plurality of legs, power sources or controllers, and/or rotating carriers of an example transport mechanism, in other example embodiments, various other numbers, configurations, and arrangements of the various components or portions of an example transport mechanism may be included. For example, the base and the plurality of legs may have different numbers, sizes, shapes, or dimensions. In addition, other numbers of rotating carriers, e.g., one, two, or more, may be coupled to a base. Further, the sizes, shapes, dimensions, positions, orientations, numbers of conveyor sections and associated trays, and/or other aspects of the rotating carriers may also be modified.

Figure 3:
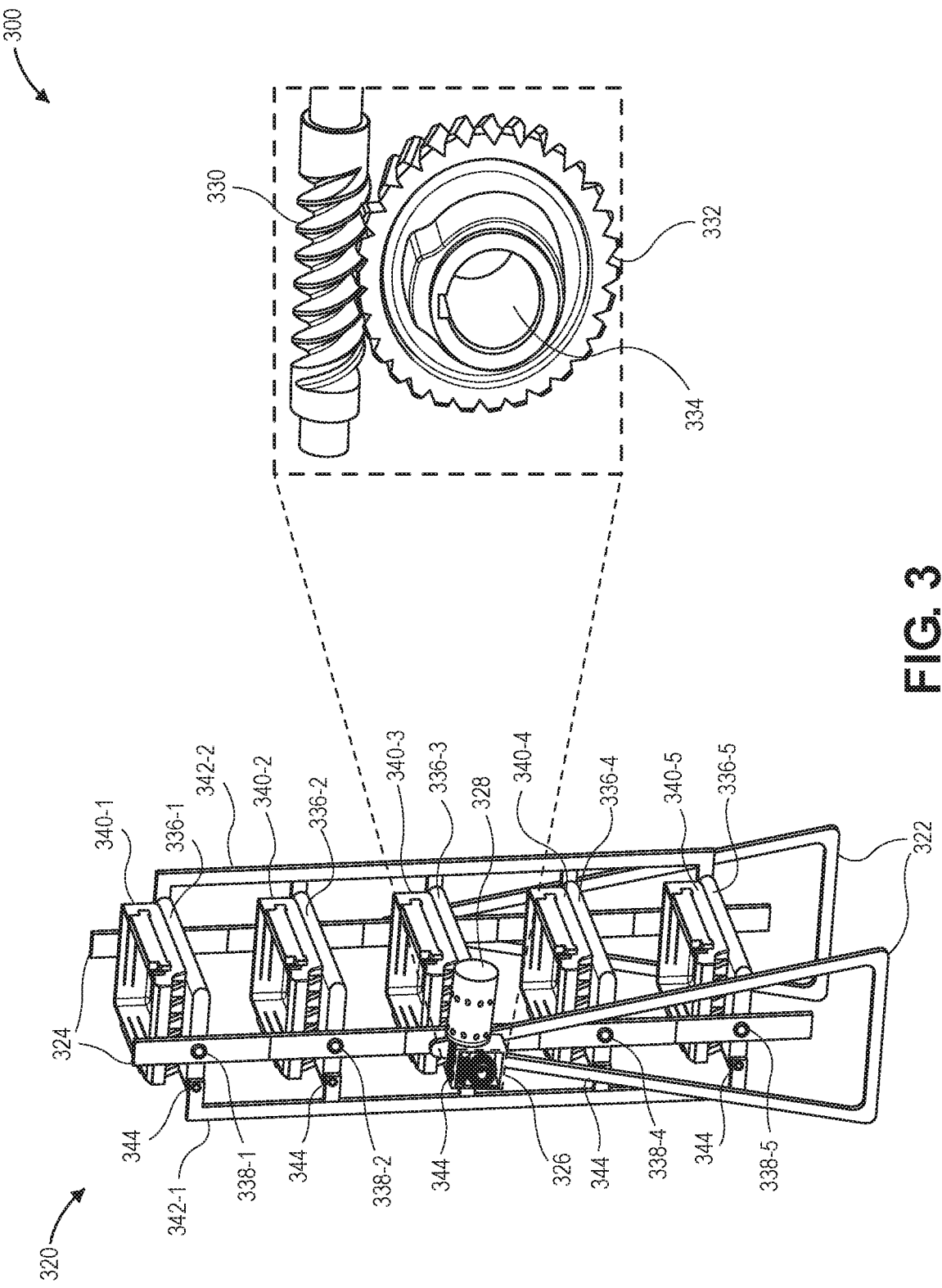
FIG. 3 is a schematic, perspective view diagram, and a close-up, internal view diagram, of a portion of an example mobile, rotatable, transport mechanism, in accordance with implementations of the present disclosure.

FIG. 3 is a schematic, perspective view diagram, and a close-up, internal view diagram, 300 of a portion of an example mobile, rotatable, transport mechanism, in accordance with implementations of the present disclosure. The example rotating carrier 320 shown in FIG. 3 may be an example of the rotating carriers 220 shown in FIG. 2.

As shown in FIG. 3, the example rotating carrier 320 may include a frame 322, rotating arms 324, and a plurality of conveyor sections 336. The frame 322 may include a plurality of beams, poles, struts, columns, or other structures that are coupled to a base, e.g., via fasteners, welds, brackets, and/or various other permanent, semi-permanent, or releasable connections, and that support the rotating carrier 320 and the plurality of conveyor sections 336. In other example embodiments, the frame 322 may have other shapes or configurations, such as rectangular, box, single beam, multiple beams, parallel beams, or other shapes, as long as the frame 322 provides structural support to the rotating carrier 320 and the plurality of conveyor sections 336. The frame 322 may comprise at least two portions that are positioned on opposite sides of the rotating carrier 320.

In addition, the rotating arms 324 may include a plurality of beams, poles, struts, or other structures that are rotatably coupled to the frame 322 via rotatable joints (occluded by the drive train 326 and actuator 328 in FIG. 3), e.g., substantially at a center point of the arms and via shafts, pins, rods, bearings, and/or various other rotatable connections. The rotating arms 324 may comprise at least two portions that are positioned on opposite sides of the rotating carrier 320. Further, the rotating arms 324 may be coupled to the plurality of conveyor sections 336 via rotatable joints 338. For example, as shown in FIG. 3, the rotating arms 324 may be coupled to five individual conveyor sections 336-1, 336-2, 336-3, 336-4, 336-5 via respective rotatable joints 338-1, 338-2, 338-4, 338-5 (a central rotatable joint for conveyor section 336-3 being occluded by the drive train 326 and actuator 328 in FIG. 3), e.g., substantially at a center point of the individual conveyor sections 336 and via shafts, pins, rods, bearings, and/or various other rotatable connections. Further, the central rotatable joint between the rotating arms 324 and the conveyor section 336-3 may be substantially coaxially aligned with the rotatable joint between the rotating arms 324 and the frame 322.

The rotating arms 324 may be selectively rotated between various orientations by a drive train 326 and an actuator 328 coupled to a portion of the rotating arms 324. For example, the rotating arms 324 may be selectively rotated to a substantially vertical orientation, as shown in FIG. 3, in which the rotating arms 324 are substantially vertically oriented and the plurality of conveyor sections 336 are substantially vertically stacked relative to each other, e.g., during transport of the rotating carrier. In addition, the rotating arms 324 may be selectively rotated to a substantially horizontal orientation, as described herein, in which the rotating arms 324 are substantially horizontally oriented and the plurality of conveyor sections 336 are substantially horizontally aligned relative to each other, e.g., during transfer of items, trays, or totes between the rotating carrier and other stations or processes. Further, the rotating arms 324 may be selectively rotated to various other orientations other than substantially vertical or substantially horizontal orientations as desired.

In addition, the substantially vertical orientation may comprise angles of the rotating arms 324 up to, approximately, or greater than plus or minus 10 degrees relative to vertical, as long as objects received by the transport mechanism can be safely and reliably carried, moved, or transported by the transport mechanism and its conveyor sections. In some example embodiments, a transport orientation of the example mobile, rotatable, transport mechanism may comprise the substantially vertical orientation of the rotating arms 324. In other example embodiments, the transport orientation may comprise other orientations, including the substantially vertical orientation, the substantially horizontal orientation, or various angled orientations of the rotating arms 324.

Further, the substantially horizontal orientation may comprise angles of the rotating arms 324 up to, approximately, or greater than plus or minus 10 degrees relative to horizontal, as long as objects received by the transport mechanism can be safely and reliably received, loaded, unloaded, moved, or transferred by the transport mechanism and its conveyor sections. In some example embodiments, a transfer orientation of the example mobile, rotatable, transport mechanism may comprise the substantially horizontal orientation of the rotating arms 324. In other example embodiments, the transfer orientation may comprise other orientations, including the substantially horizontal orientation, the substantially vertical orientation, or various angled orientations of the rotating arms 324.

In one example embodiment, as shown in the close-up, internal view diagram of FIG. 3, the drive train 326 may comprise a worm gear 330, a driven gear 332, and a keyed hole 334 to receive a shaft, pin, or rod coupled to the rotating arms 324. The worm gear 330 may be mounted to a shaft of the actuator 328, and the driven gear 332 may be coupled to a shaft, pin, or rod of the rotating arms 324 via the keyed hole 334. Further, a shaft, pin, or rod that couples the rotating arms 324 and the keyed hole 334 of the driven gear 332 may comprise at least a portion of the rotatable joint between the rotating arms 324 and the frame 322, which may be substantially coaxially aligned with the central rotatable joint between the rotating arms 324 and the conveyor section 336-3.

In addition, teeth of the worm gear 330 may mate with teeth of the driven gear 332. In this example, the actuator 328, e.g., a motor or other rotary actuator, may rotate the shaft and worm gear 330 in either rotational direction to cause corresponding rotation of the mating driven gear 332 and the shaft, pin, or rod coupled to the rotating arms 324 via the keyed hole 334. In this manner, the rotating arms 324 may be rotated between various orientations, including substantially vertical and substantially horizontal orientations. In particular, the worm gear drive mechanism shown in FIG. 3 may substantially prevent backdriving or spurious movements of the rotating arms 324 responsive to weight, loads, or other external forces that may be applied to the rotating arms 324 and associated conveyor sections 336.

In other example embodiments, the rotating arms 324 may be rotated using various other types of mechanisms or actuators, such as other gear drives, chain drives, belt drives, or other types of mechanisms or actuators. In some such example embodiments, the other types of mechanisms or actuators may also include one or more brakes, locks, or other devices to hold or maintain particular orientations of the rotating arms 324 responsive to weight, loads, or other external forces that may be applied to the rotating arms 324 and associated conveyor sections 336.

Further, the particular orientation of the rotating arms 324 may be detected or determined using various sensors or other methods. For example, one or more photoeyes, proximity sensors, imaging sensors, or other types of position sensors may be associated with portions of the rotating arms 324, the frame 322, and/or other portions of the rotating carrier 320 to measure or detect a current orientation of the rotating arms 324. In addition, encoders or other rotary position sensors may be associated with the drive train 326 and/or the actuator 328 to measure or detect a current orientation of the rotating arms 324 based on measured or sensed rotation or movement of the drive train 326 and/or the actuator 328. Various other types of sensors or methods may also be used to detect or determine a current orientation of the rotating arms 324.

In some example embodiments, the rotating arms 324 may be able to rotate approximately three hundred and sixty degrees or more without limits, in one or both rotational directions, relative to the frame 322. In other example embodiments, the rotating arms 324 may have limits on the available range of rotation, in one or both rotational directions, relative to the frame 322. For example, a total available range of rotation may be limited to approximately three hundred and sixty degrees, approximately two hundred and seventy degrees, or approximately one hundred and eighty degrees, with the substantially vertical orientation shown in FIG. 3 being the approximate center orientation with respect to the total available range of rotation.

Further, the plurality of conveyor sections 336 may be coupled to the rotating arms 324 via rotatable joints 338. For example, as shown in FIG. 3, five individual conveyor sections 336-1, 336-2, 336-3, 336-4, 336-5 may be coupled to the rotating arms 324 via respective rotatable joints 338-1, 338-2, 338-4, 338-5 (a central rotatable joint for conveyor section 336-3 being occluded by the drive train 326 and actuator 328 in FIG. 3), e.g., substantially at a center point of the individual conveyor sections 336 and via shafts, pins, rods, bearings, and/or various other rotatable connections. In addition, each of the five individual conveyor sections 336-1, 336-2, 336-3, 336-4, 336-5 may be configured to receive respective items, trays, totes, bins, containers, packages, products, or other objects 340-1, 340-2, 340-3, 340-4, 340-5.

Each conveyor section 336 may include one or more rollers, belts, transverse rollers, transverse belts, or other conveyance mechanisms and associated actuators, e.g., motors, rotary actuators, servos, solenoids, linear actuators, or other actuators, to transfer objects, items, trays, or totes 340 on and off each conveyor section 336. For example, an item, tray, or tote 340 may be selectively loaded onto a conveyor section 336, and an item, tray, or tote 340 may also be selectively unloaded from a conveyor section 336. In example embodiments, each conveyor section 336 may be actuatable to transfer items, trays, or totes 340 independently of other conveyor sections 336. In other example embodiments, the plurality of conveyor sections 336 may be actuatable collectively to transfer items, trays, or totes 340.

In addition, each conveyor section 336 may also include one or more end stops, such as bars, posts, rods, beams, blocks, walls, or other structures, that may be selectively actuated, e.g., using servos, solenoids, or other actuators, to retain items, trays, or totes 340 on respective conveyor sections 336. For example, the end stops may raise or pop up, e.g., proximate one or more sides or edges of the conveyor sections, in order to prevent items, trays, or totes 340 from falling off or moving toward a side or edge of the conveyor sections, such as during transport in a substantially vertical orientation of the rotating carrier, and the end stops may lower or drop down in order to allow transfer of items, trays, or totes 340 between the conveyor sections and other stations or processes, such as during transfer in a substantially horizontal orientation of the rotating carrier.

Further, the particular status of each conveyor section 336, e.g., carrying or not carrying an item, tray, or tote, may be detected or determined using various sensors or other methods. For example, one or more photoeyes, proximity sensors, imaging sensors, weight or load sensors, or other types of sensors may be associated with portions of the conveyor sections 336 and/or other portions of the rotating carrier 320 to measure or detect an item, tray, or tote on the individual conveyor sections 336. Various other types of sensors or methods may also be used to detect or determine a current status of individual conveyor sections 336.

The trays, totes, bins, or other containers 340 may comprise a plurality of walls and a base that form a container or enclosure that may receive, contain, or carry one or more items or products. In example embodiments, one or more walls may also include holes, slots, ribs, corrugations, or other features to facilitate grasping, lifting, movement, and/or transfer of the tray or tote, e.g., by human associates or using robotic or automated machinery. In some example embodiments, one or more partitions may be added or included within the walls to create individual compartments or zones within the tray or tote 340. Further, the walls and base of the tray or tote 340 may have various dimensions associated with width, depth, and/or height. For example, the tray or tote 340 may be sized or configured to be received and carried by individual conveyor sections of the rotating carrier.

In addition, the plurality of trays, totes, bins, or other containers 340 may be formed from sturdy, lightweight materials, such as plastics, cardboard, fiberboard, composites, metals, other materials, or combinations thereof. For example, the tray or tote 340 may be designed or configured to receive, contain, or carry approximately one, two, five, ten, or more items or products.

Although FIG. 3 illustrates a particular number, configuration, spacing, and arrangement of the plurality of conveyor sections, in other example embodiments, other numbers, configurations, spacings, or arrangements of the plurality of conveyor sections are possible. For example, two, three, five, ten, or more conveyor sections may be coupled to and rotated by a rotating carrier. In addition, spacing of the conveyor sections from each other may be varied based on a size, height, or other dimensions associated with items, trays, or totes to be received by the conveyor sections. Furthermore, for taller or larger totes, the spacing between the conveyor sections may be large enough such that in a substantially horizontal orientation of the rotating carrier, a horizontal gap between adjacent conveyor sections may be too large to reliably transfer the totes between the adjacent conveyor sections. In such examples, the totes may be transferred using transverse rollers and/or belts between individual conveyor sections and other stations, conveyors, or processes.

As shown in FIG. 3, the rotating carrier 320 may also include a leveling mechanism, including linkage arms 342-1, 342-2 coupled to portions of each of the plurality of conveyor sections 336 via respective rotatable joints 344, e.g., via shafts, pins, rods, bearings, and/or various other rotatable connections. The linkage arms 342-1, 342-2 may comprise at least two portions that are positioned on opposite sides of the rotating carrier 320. For example, the linkage arm 342-1 may be rotatably coupled to each of the plurality of conveyor sections 336 via rotatable joints 344 proximate a first side or edge of the plurality of conveyor sections 336 on one side of the rotating carrier 320. In addition, the linkage arm 342-2 may be rotatably coupled to each of the plurality of conveyor sections 336 via rotatable joints 344 proximate a second side or edge of the plurality of conveyor sections 336 on an opposite side of the rotating carrier 320.

The leveling mechanism may function to maintain each of the plurality of conveyor sections 336 in a substantially flat horizontal orientation, or in a same relative orientation, during and throughout rotation of the rotating arms 324 of the rotating carrier 320 between various orientations, including the substantially vertical and substantially horizontal orientations. This leveling function may be advantageous to prevent items, trays, or totes from moving toward or falling off of sides or edges of the individual conveyor sections during various operations of the rotating carrier.

In order to effect this leveling function, a center conveyor section 336-3 may be fixed in a substantially flat horizontal orientation to prevent rotation of the center conveyor section 336-3 around its rotatable joint with the rotating arms 324. For example, the center conveyor section 336-3 may be fixedly coupled, attached, or mounted to a portion of the frame 322, e.g., to a portion of the frame 322 on an opposite side of the rotating carrier 320 from the drive train 326 and actuator 328. Then, during rotation of the rotating arms 324, the center conveyor section 336-3 may remain in a substantially flat horizontal orientation due to its fixed coupling or attachment to a portion of the frame 322. In addition, as a result of the attachments between the plurality of conveyor sections 336 via the linkage arms 342 at respective rotatable joints 344, each of the other conveyor sections 336 may also passively remain in a substantially flat horizontal orientation due to the fixed coupling or attachment of the center conveyor section 336-3 to a portion of the frame 322. In this manner, each of the plurality of conveyor sections 336 may be maintained in a substantially flat horizontal orientation during and throughout rotation of the rotating arms 324 of the rotating carrier 320 between various orientations, including the substantially vertical and substantially horizontal orientations.

In other example embodiments, instead of a center conveyor section 336-3 that is fixed in a substantially flat horizontal orientation, a central beam, rod, plate, or other surface or component that may not include a conveyor section may be fixed in a particular orientation relative to a portion of the frame 322, and a remainder of conveyor sections 336, e.g., conveyor sections 336-1, 336-2, 336-4, 336-5, may be coupled to the fixed central beam, rod, plate, or other surface or component via the linkage arms 342. Then, during rotation of the rotating arms 324, the fixed central beam, rod, plate, or other surface or component may remain in a fixed orientation due to its fixed coupling or attachment to a portion of the frame 322. In addition, as a result of the attachments between the fixed central beam and the plurality of conveyor sections 336 via the linkage arms 342 at respective rotatable joints 344, each of the conveyor sections 336 may also passively remain in a substantially flat horizontal orientation due to the fixed coupling or attachment of the fixed central beam to a portion of the frame 322. In this manner, each of the plurality of conveyor sections 336 may be maintained in a substantially flat horizontal orientation during and throughout rotation of the rotating arms 324 of the rotating carrier 320 between various orientations, including the substantially vertical and substantially horizontal orientations. Such example embodiments having a fixed central beam may generally be utilized with a rotating carrier 320 having an even number of conveyor sections 336, although the fixed central beam may also be utilized with a rotating carrier 320 having any number of conveyor sections 336.

In addition, the linkage arms 342 may potentially limit the total available range of rotation of the rotating carrier 320 due to a potential interference or collision between portions of the linkage arms 342 and the rotating arms 324, a portion of the drive train 326, and/or the rotatable joints 338 of the conveyor sections 336. Nonetheless, the linkage arms 342 may permit a total available range of rotation of the rotating carrier 320 of at least approximately one hundred and eighty degrees, approximately two hundred and seventy degrees, or up to approximately three hundred and sixty degrees, with the substantially vertical orientation shown in FIG. 3 being the approximate center orientation with respect to the total available range of rotation.

In additional example embodiments, an angle control actuator, such as a motor, servo, solenoid, or other type of actuator, may be operatively connected with the center conveyor section 336-3 (or the fixed central beam, rod, plate, or other surface or component), and may cause rotation of the center conveyor section 336-3 (or the fixed central beam, rod, plate, or other surface or component) relative to the frame 322 and/or a robotic drive unit engaged with the frame 322. For example, the angle control actuator may be associated with the frame 322 and directly coupled to the center conveyor section 336-3 (or the fixed central beam), in order to rotate the center conveyor section 336-3 (or the fixed central beam) relative to the frame 322. Alternatively, the angle control actuator may be indirectly coupled to the center conveyor section 336-3 (or the fixed central beam) via another linkage element or other component, in order to rotate the center conveyor section 336-3 (or the fixed central beam) relative to the frame 322. In some example embodiments, the angle control actuator may be associated with a robotic drive unit, and the linkage element or other component may extend between the robotic drive unit and the center conveyor section 336-3 (or the fixed central beam), in order to rotate the center conveyor section 336-3 (or the fixed central beam) relative to the frame 322 and/or the robotic drive unit. Thus, the center conveyor section 336-3 (or the fixed central beam) may be angled to a particular orientation as desired.

In addition, as a result of the attachments between the plurality of conveyor sections 336 via the linkage arms 342 at respective rotatable joints 344, each of the other conveyor sections 336 may also be actively angled to the particular orientation responsive to the angular adjustment of the center conveyor section 336-3 (or the fixed central beam) relative to the frame 322 and/or a robotic drive unit. In this manner, each of the plurality of conveyor sections 336 may be angled to any desired orientation collectively, and the angled orientation of the plurality of conveyor sections 336 may be used, in combination with a corresponding angled orientation of the rotating arms 324, to transfer items, trays, or totes along an angled, inclined, or declined direction or orientation using the plurality of conveyor sections 336 of the rotating carrier 320. In such example embodiments of active angle control of conveyor sections 336, one or more brakes, locks, or other devices may also be included to hold or maintain particular angled orientations of the conveyor sections 336 responsive to weight, loads, or other external forces that may be applied to the rotating arms 324 and associated conveyor sections 336.

Further, a particular angle of the conveyor sections 336 may be detected or determined using various sensors or other methods. For example, one or more photoeyes, proximity sensors, imaging sensors, or other types of position sensors may be associated with portions of the leveling mechanism, the frame 322, the rotating arms 324, the conveyor sections 336, the linkage arms 342, and/or other portions of the rotating carrier 320 to measure or detect a current angle of the conveyor sections 336. In addition, encoders or other rotary position sensors may be associated with portions of the leveling mechanism, the angle control actuator, the conveyor sections 336, and/or other portions of the rotating carrier 320 to measure or detect a current angle of the conveyor sections 336 based on measured or sensed rotation or movement of such components. Various other types of sensors or methods may also be used to detect or determine a current angle of the conveyor sections 336.

Although FIG. 3 illustrates a particular number, shape, size, configuration, and arrangement of the linkage arms, in other example embodiments, other numbers, shapes, sizes, configurations, or arrangements of the linkage arms are possible. For example, the linkage arms may have angled, curved, arced, or other shapes, instead of the substantially U-shaped or L-shaped linkage arms shown in FIG. 3. In addition, the linkage arms may include grooves, cutouts, indentations, protrusions, or other formations or shapes to reduce potential interferences or collisions between portions of the linkage arms and the rotating arms, a portion of the drive train, and/or the rotatable joints of the conveyor sections.

Further, the frame 322, the rotating arms 324, the drive train 326 and/or its components, the actuator 328, the plurality of conveyor sections 336, the linkage arms 342, and/or various rotatable joints may be formed from various materials, such as metals, plastics, composites, other materials, or combinations thereof.

Figure 4:
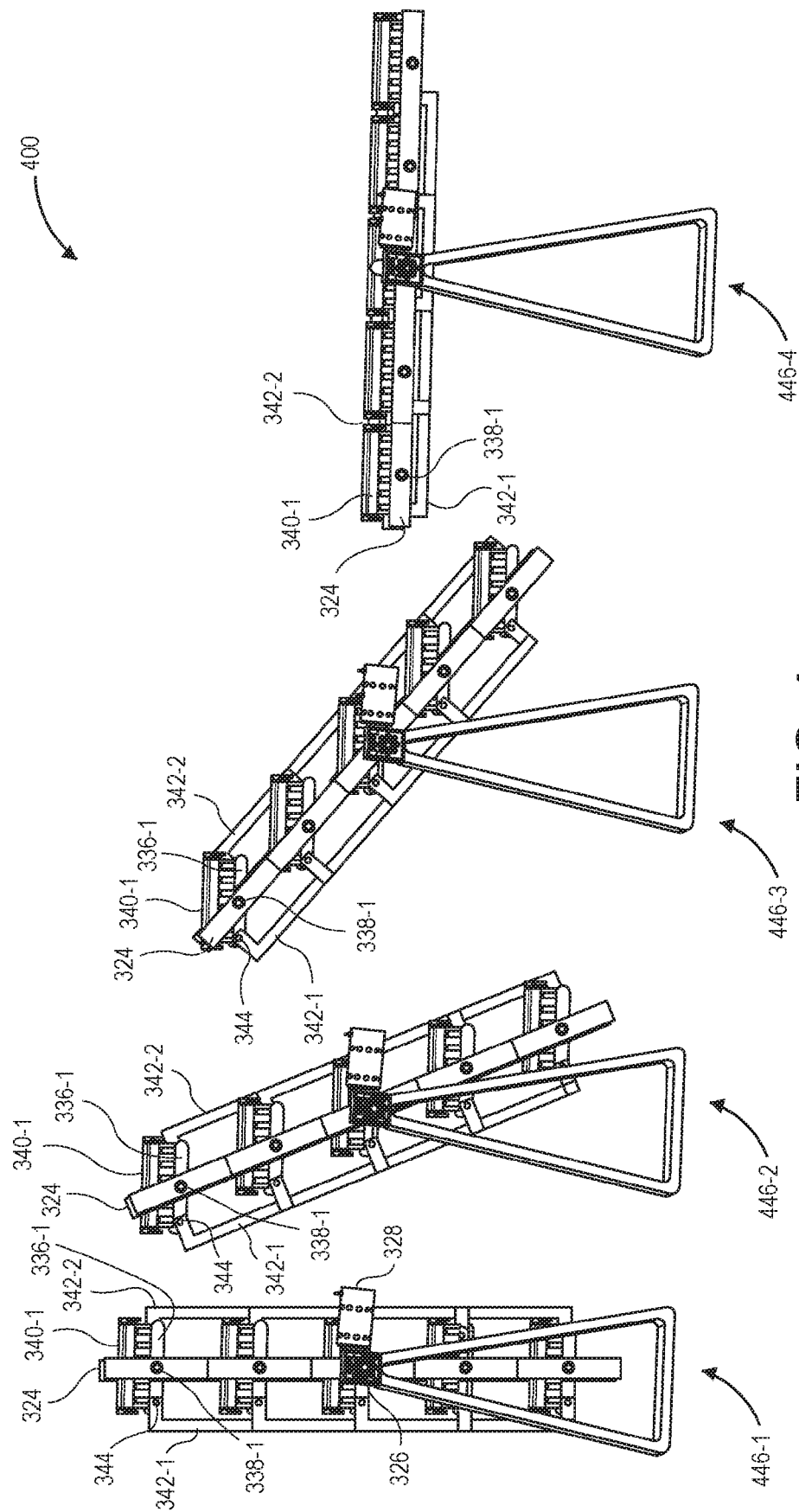
FIG. 4 is a schematic, side view diagram showing multiple orientations of a portion of an example mobile, rotatable, transport mechanism, in accordance with implementations of the present disclosure.

FIG. 4 is a schematic, side view diagram 400 showing multiple orientations of a portion of an example mobile, rotatable, transport mechanism, in accordance with implementations of the present disclosure.

As shown in FIG. 4, a first orientation 446-1 of an example rotating carrier may be a substantially vertical orientation, e.g., which may comprise a transport orientation during transport of the rotating carrier within an environment by a robotic drive unit. In the first orientation 446-1, the plurality of conveyor sections 336 and associated objects, trays, or totes 340 may be substantially vertically stacked relative to each other responsive to operation of the actuator 328 and drive train 326 to move or rotate the rotating arms 324 into the substantially vertical orientation. Further, the plurality of conveyor sections 336 and associated objects, trays, or totes 340 may be maintained in a substantially flat horizontal orientation due to the attachments between the conveyor sections 336 and the linkage arms 342 via rotatable joints 344, with one of the conveyor sections, e.g., a center conveyor section, being fixed in the substantially flat horizontal orientation relative to the frame.

A second orientation 446-2 of an example rotating carrier may be a first angled orientation, e.g., during rotation of the rotating carrier at a transfer position within an environment. In the second orientation 446-2, the plurality of conveyor sections 336 and associated objects, trays, or totes 340 may be oriented at a first angle relative to each other responsive to operation of the actuator 328 and drive train 326 to move or rotate the rotating arms 324 into the first angled orientation. Further, at the first angled orientation, the plurality of conveyor sections 336 and associated objects, trays, or totes 340 may be maintained in a substantially flat horizontal orientation due to the attachments between the conveyor sections 336 and the linkage arms 342 via rotatable joints 344, with one of the conveyor sections, e.g., a center conveyor section, being fixed in the substantially flat horizontal orientation relative to the frame.

A third orientation 446-3 of an example rotating carrier may be a second angled orientation, e.g., during continued rotation of the rotating carrier at a transfer position within an environment. In the third orientation 446-3, the plurality of conveyor sections 336 and associated objects, trays, or totes 340 may be oriented at a second angle relative to each other responsive to continued operation of the actuator 328 and drive train 326 to move or rotate the rotating arms 324 into the second angled orientation. Further, at the second angled orientation, the plurality of conveyor sections 336 and associated objects, trays, or totes 340 may be maintained in a substantially flat horizontal orientation due to the attachments between the conveyor sections 336 and the linkage arms 342 via rotatable joints 344, with one of the conveyor sections, e.g., a center conveyor section, being fixed in the substantially flat horizontal orientation relative to the frame.

Then, a fourth orientation 446-4 of an example rotating carrier may be a substantially horizontal orientation, e.g., which may comprise a transfer orientation during transfer of trays or totes between the rotating carrier and a transfer position within an environment. In the fourth orientation 446-4, the plurality of conveyor sections 336 and associated objects, trays, or totes 340 may be substantially horizontally aligned with each other responsive to continued operation of the actuator 328 and drive train 326 to move or rotate the rotating arms 324 into the substantially horizontal orientation. Further, at the substantially horizontal orientation, the plurality of conveyor sections 336 and associated objects, trays, or totes 340 may still be maintained in a substantially flat horizontal orientation due to the attachments between the conveyor sections 336 and the linkage arms 342 via rotatable joints 344, with one of the conveyor sections, e.g., a center conveyor section, being fixed in the substantially flat horizontal orientation relative to the frame.

In this manner, an example rotating carrier may be moved or rotated between various orientations, including substantially vertical and substantially horizontal orientations. In some example embodiments, the rotating carrier may be rotated to the substantially vertical orientation in order to transport the rotating carrier within an environment. In further example embodiments, the rotating carrier may be rotated to the substantially horizontal orientation in order to transfer items, trays, or totes between the rotating carrier and a transfer position, e.g., for loading or unloading, within an environment. In other example embodiments, one or more angled orientations of the rotating carrier may also be used during transport of the rotating carrier within an environment, e.g., due to space constraints or to avoid potential interferences or collisions. In still other example embodiments, one or more angled orientations of the rotating carrier may also be used during transfer of items, trays, or totes between the rotating carrier and a transfer position within an environment, e.g., potentially in combination with corresponding angular adjustments to the individual conveyor sections via the leveling mechanism and associated angle control actuator.

FIGS. 5A and 5B are schematic, partial, side view diagrams 500A, 500B showing multiple positions of a portion of another example mobile, rotatable, transport mechanism, in accordance with implementations of the present disclosure. FIGS. 5A and 5B illustrate an alternative, example leveling mechanism to those described at least with respect to FIGS. 3 and 4.

As described herein, the alternative, example leveling mechanism may function to maintain each of the plurality of conveyor sections in a substantially flat horizontal orientation, or in a same relative orientation, during and throughout rotation of the rotating arms of the rotating carrier between various orientations, including the substantially vertical and substantially horizontal orientations. This leveling function may be advantageous to prevent items, trays, or totes from moving toward or falling off of sides or edges of the individual conveyor sections during various operations of the rotating carrier.

As shown in FIGS. 5A and 5B, the example leveling mechanism may include a first gear, wheel, pulley, or sprocket 550-1 that is coupled to a first conveyor section 536-1 via a first attachment 538-1. The first attachment 538-1 may be a keyed, splined, or other similar attachment such that the first gear 550-1 and the first conveyor section 536-1 are rotationally fixed relative to each other. That is, if the first gear 550-1 rotates, then the first conveyor section 536-1 also rotates a corresponding amount, and vice versa. In addition, the first gear 550-1 and the first conveyor section 536-1 may be rotatably coupled to the rotating arms 324 via rotatable joints, e.g., via shafts, pins, rods, bearings, and/or various other rotatable connections, that may be substantially coaxially aligned with the first attachment 538-1.

Similarly, the example leveling mechanism may include a second gear, wheel, pulley, or sprocket 550-2 that is coupled to a second conveyor section 536-2 via a second attachment 538-2. The second attachment 538-2 may be a keyed, splined, or other similar attachment such that the second gear 550-2 and the second conveyor section 536-2 are also rotationally fixed relative to each other. That is, if the second gear 550-2 rotates, then the second conveyor section 536-2 also rotates a corresponding amount, and vice versa. In addition, the second gear 550-2 and the second conveyor section 536-2 may be rotatably coupled to the rotating arms 324 via rotatable joints, e.g., via shafts, pins, rods, bearings, and/or various other rotatable connections, that may be substantially coaxially aligned with the second attachment 538-2.

In addition, the second conveyor section 536-2 may function as a center conveyor section, as described herein, that is fixed in a substantially flat horizontal orientation to prevent rotation of the second conveyor section 536-2 around its rotatable joint with the rotating arms of a rotating carrier. For example, the second conveyor section 536-2 may be fixedly coupled, attached, or mounted to a portion of a frame relative to which the rotating carrier rotates. Then, during rotation of the rotating arms, the second conveyor section 536-2 may remain in a substantially flat horizontal orientation due to its fixed coupling or attachment to a portion of the frame.

Further, the first gear 550-1 and the second gear 550-2 may be operatively connected to each other via a chain, belt, or rope 552. Due to the operative connection between the first and second gears 550-1, 550-2 via the chain or belt 552, the first and second gears 550-1, 550-2 may maintain a same relative orientation during and throughout rotation of the rotating arms 324. Further, due to the fixed coupling or attachment between the first gear 550-1 and the first conveyor section 536-1 and the fixed coupling or attachment between the second gear 550-2 and the second conveyor section 536-2, the first and second conveyor sections 536-1, 536-2 may also maintain a same relative orientation during and throughout rotation of the rotating arms 324.

Thus, in the substantially vertical orientation shown in FIG. 5A, the second conveyor section 536-2 may remain in a substantially flat horizontal orientation due to the fixed coupling or attachment of the second conveyor section 536-2 to a portion of the frame. In addition, as a result of the operative connection between the first and second gears 550-1, 550-2 via the chain or belt 552, the rotationally fixed coupling or attachment between the first gear 550-1 and the first conveyor section 536-1, the rotationally fixed coupling or attachment between the second gear 550-2 and the second conveyor section 536-2, and the rotatable connections between the first and second conveyor sections 536-1, 536-2 and the rotating arms 324, the first conveyor section 536-1 may also passively remain in a substantially flat horizontal orientation.

In addition, in the angled orientation shown in FIG. 5B, the second conveyor section 536-2 may again remain in a substantially flat horizontal orientation due to the fixed coupling or attachment of the second conveyor section 536-2 to a portion of the frame. In addition, as a result of the operative connection between the first and second gears 550-1, 550-2 via the chain or belt 552, the rotationally fixed coupling or attachment between the first gear 550-1 and the first conveyor section 536-1, the rotationally fixed coupling or attachment between the second gear 550-2 and the second conveyor section 536-2, and the rotatable connections between the first and second conveyor sections 536-1, 536-2 and the rotating arms 324, the first conveyor section 536-1 may again also passively remain in a substantially flat horizontal orientation.

In this manner, each of the plurality of conveyor sections 536 may be maintained in a substantially flat horizontal orientation during and throughout rotation of the rotating arms 324 of the rotating carrier 320 between various orientations, including the substantially vertical and substantially horizontal orientations.

In addition, the first and second gears 550-1, 550-2 and operatively connected chain or belt 552 may not cause any potential interference or collision with other portions of the rotating carrier, such that this alternative, example leveling mechanism may not impose any limits on the total available range of rotation of the rotating carrier. Thus, the alternative, example leveling mechanism may permit a substantially unlimited available range of rotation of the rotating carrier in either direction of rotation, while maintaining each of the plurality of conveyor sections in a substantially flat horizontal orientation, or in a same relative orientation.

In additional example embodiments, an angle control actuator, such as a motor, servo, solenoid, or other type of actuator, may be operatively connected with the second conveyor section 536-2, and may cause rotation of the second conveyor section 536-2 relative to the frame. Thus, the second conveyor section 536-2 may be angled to a particular orientation as desired. In addition, as a result of the alternative, example leveling mechanism described herein, each of the other conveyor sections may also be actively angled to the particular orientation responsive to the angular adjustment of the second conveyor section 536-2 relative to the frame. In this manner, each of the plurality of conveyor sections may be angled to any desired orientation collectively, and the angled orientation of the plurality of conveyor sections may be used, in combination with a corresponding angled orientation of the rotating arms, to transfer items, trays, or totes along an angled, inclined, or declined direction or orientation using the plurality of conveyor sections of the rotating carrier. In such example embodiments of active angle control of conveyor sections 536, one or more brakes, locks, or other devices may also be included to hold or maintain particular angled orientations of the conveyor sections 536 responsive to weight, loads, or other external forces that may be applied to the rotating arms 324 and associated conveyor sections 536.

Further, a particular angle of the conveyor sections 536 may be detected or determined using various sensors or other methods. For example, one or more photoeyes, proximity sensors, imaging sensors, or other types of position sensors may be associated with portions of the leveling mechanism, the frame, the rotating arms 324, the conveyor sections 536, the gears 550, and/or other portions of the rotating carrier to measure or detect a current angle of the conveyor sections 536. In addition, encoders or other rotary position sensors may be associated with portions of the leveling mechanism, the angle control actuator, the conveyor sections 536, the gears 550, and/or other portions of the rotating carrier to measure or detect a current angle of the conveyor sections 536 based on measured or sensed rotation or movement of such components. Various other types of sensors or methods may also be used to detect or determine a current angle of the conveyor sections 536.

Although FIGS. 5A and 5B illustrate a particular number, shape, size, configuration, and arrangement of the gears, belts, and conveyor sections, in other example embodiments, other numbers, shapes, sizes, configurations, or arrangements of the gears, belts, and conveyor sections are possible. For example, more than two conveyor sections may be operatively connected via additional gears and belts as described herein to maintain all such conveyor sections in desired angular orientations.

FIGS. 6A and 6B are schematic, partial, side view diagrams 600A, 600B showing multiple positions of a portion of a further example mobile, rotatable, transport mechanism, in accordance with implementations of the present disclosure. FIGS. 6A and 6B illustrate another alternative, example leveling mechanism to those described at least with respect to FIGS. 3, 4, 5A, and 5B.

As described herein, the alternative, example leveling mechanism may function to maintain each of the plurality of conveyor sections in a substantially flat horizontal orientation, or in a same relative orientation, during and throughout rotation of the rotating arms of the rotating carrier between various orientations, including the substantially vertical and substantially horizontal orientations. This leveling function may be advantageous to prevent items, trays, or totes from moving toward or falling off of sides or edges of the individual conveyor sections during various operations of the rotating carrier.

As shown in FIGS. 6A and 6B, the example leveling mechanism may include a first gear, wheel, pulley, or sprocket 650-1 that is coupled to a first conveyor section 636-1 via a first attachment 638-1. The first attachment 638-1 may be a keyed, splined, or other similar attachment such that the first gear 650-1 and the first conveyor section 636-1 are rotationally fixed relative to each other. That is, if the first gear 650-1 rotates, then the first conveyor section 636-1 also rotates a corresponding amount, and vice versa. In addition, the first gear 650-1 and the first conveyor section 636-1 may be rotatably coupled to the rotating arms 324 via rotatable joints, e.g., via shafts, pins, rods, bearings, and/or various other rotatable connections, that may be substantially coaxially aligned with the first attachment 638-1.

Similarly, the example leveling mechanism may include a third gear, wheel, pulley, or sprocket 650-3 that is coupled to a third conveyor section 636-3 via a third attachment 638-3. The third attachment 638-3 may be a keyed, splined, or other similar attachment such that the third gear 650-3 and the third conveyor section 636-3 are also rotationally fixed relative to each other. That is, if the third gear 650-3 rotates, then the third conveyor section 636-3 also rotates a corresponding amount, and vice versa. In addition, the third gear 650-3 and the third conveyor section 636-3 may be rotatably coupled to the rotating arms 324 via rotatable joints, e.g., via shafts, pins, rods, bearings, and/or various other rotatable connections, that may be substantially coaxially aligned with the third attachment 638-3.

In addition, the example leveling mechanism may also include second gear, wheel, pulley, or sprocket 650-2 that is fixed in a particular orientation to prevent rotation of the second gear 650-2 around its rotatable joint with the rotating arms of a rotating carrier. For example, the second gear 650-2 may be fixedly coupled, attached, or mounted via a second attachment 638-2 to a portion of a frame relative to which the rotating carrier rotates. The second attachment 638-2 may be a keyed, splined, or other similar attachment such that the second gear 650-2 is rotationally fixed relative to the frame. In addition, the second gear 650-2 may be rotatably coupled to the rotating arms 324 via rotatable joints, e.g., via shafts, pins, rods, bearings, and/or various other rotatable connections, that may be substantially coaxially aligned with the second attachment 638-2. Then, during rotation of the rotating arms, the second gear 650-2 may remain fixed in its particular orientation due to its fixed coupling or attachment to a portion of the frame.

Further, the first gear 650-1, the second gear 650-2, and the third gear 650-3 may be operatively connected to each other via a chain, belt, or rope 652. Due to the operative connection between the first, second, and third gears 650-1, 650-2, 650-3 via the chain or belt 652, the first, second, and third gears 650-1, 650-2, 650-3 may maintain a same relative orientation during and throughout rotation of the rotating arms 324. Further, due to the fixed coupling or attachment between the first gear 650-1 and the first conveyor section 636-1 and the fixed coupling or attachment between the third gear 650-3 and the third conveyor section 636-3, the first and third conveyor sections 636-1, 636-3 may also maintain a same relative orientation during and throughout rotation of the rotating arms 324.

Thus, in the substantially vertical orientation shown in FIG. 6A, the second gear 650-2 may remain in a particular orientation due to the fixed coupling or attachment of the second gear 650-2 to a portion of the frame. In addition, as a result of the operative connection between the first, second, and third gears 650-1, 650-2, 650-3 via the chain or belt 652, the rotationally fixed coupling or attachment between the first gear 650-1 and the first conveyor section 636-1, the rotationally fixed coupling or attachment between the third gear 650-3 and the third conveyor section 636-3, and the rotatable connections between the first and third conveyor sections 636-1, 636-3 and the rotating arms 324, the first and third conveyor sections 636-1, 636-3 may also passively remain in a substantially flat horizontal orientation that corresponds to the particular orientation of the second gear 650-2.

In addition, in the angled orientation shown in FIG. 6B, the second gear 650-2 may again remain in a particular orientation due to the fixed coupling or attachment of the second gear 650-2 to a portion of the frame. In addition, as a result of the operative connection between the first, second, and third gears 650-1, 650-2, 650-3 via the chain or belt 652, the rotationally fixed coupling or attachment between the first gear 650-1 and the first conveyor section 636-1, the rotationally fixed coupling or attachment between the third gear 650-3 and the third conveyor section 636-3, and the rotatable connections between the first and third conveyor sections 636-1, 636-3 and the rotating arms 324, the first and third conveyor sections 636-1, 636-3 may again also passively remain in a substantially flat horizontal orientation that corresponds to the particular orientation of the second gear 650-2.

In this manner, each of the plurality of conveyor sections 636 may be maintained in a substantially flat horizontal orientation during and throughout rotation of the rotating arms 324 of the rotating carrier 320 between various orientations, including the substantially vertical and substantially horizontal orientations.

The first, second, and third gears 650-1, 650-2, 650-3 and operatively connected chain or belt 652 may not cause any potential interference or collision with other portions of the rotating carrier, such that this alternative, example leveling mechanism may not impose any limits on the total available range of rotation of the rotating carrier. Thus, the alternative, example leveling mechanism may permit a substantially unlimited available range of rotation of the rotating carrier in either direction of rotation, while maintaining each of the plurality of conveyor sections in a substantially flat horizontal orientation, or in a same relative orientation.

In additional example embodiments, an angle control actuator, such as a motor, servo, solenoid, or other type of actuator, may be operatively connected with the second gear 650-2, and may cause rotation of the second gear 650-2 relative to the frame. Thus, the second gear 650-2 may be angled to a particular orientation as desired. In addition, as a result of the alternative, example leveling mechanism described herein, each of the other conveyor sections may also be actively angled to the particular orientation responsive to the angular adjustment of the second gear 650-2 relative to the frame. In this manner, each of the plurality of conveyor sections may be angled to any desired orientation collectively, and the angled orientation of the plurality of conveyor sections may be used, in combination with a corresponding angled orientation of the rotating arms, to transfer items, trays, or totes along an angled, inclined, or declined direction or orientation using the plurality of conveyor sections of the rotating carrier. In such example embodiments of active angle control of conveyor sections 636, one or more brakes, locks, or other devices may also be included to hold or maintain particular angled orientations of the conveyor sections 636 responsive to weight, loads, or other external forces that may be applied to the rotating arms 324 and associated conveyor sections 636.

Further, a particular angle of the conveyor sections 636 may be detected or determined using various sensors or other methods. For example, one or more photoeyes, proximity sensors, imaging sensors, or other types of position sensors may be associated with portions of the leveling mechanism, the frame, the rotating arms 324, the conveyor sections 636, the gears 650, and/or other portions of the rotating carrier to measure or detect a current angle of the conveyor sections 636. In addition, encoders or other rotary position sensors may be associated with portions of the leveling mechanism, the angle control actuator, the conveyor sections 636, the gears 650, and/or other portions of the rotating carrier to measure or detect a current angle of the conveyor sections 636 based on measured or sensed rotation or movement of such components. Various other types of sensors or methods may also be used to detect or determine a current angle of the conveyor sections 636.

Although FIGS. 6A and 6B illustrate a particular number, shape, size, configuration, and arrangement of the gears, belts, and conveyor sections, in other example embodiments, other numbers, shapes, sizes, configurations, or arrangements of the gears, belts, and conveyor sections are possible. For example, more than two conveyor sections may be operatively connected via additional gears and belts as described herein to maintain all such conveyor sections in desired angular orientations.

Figure 7:
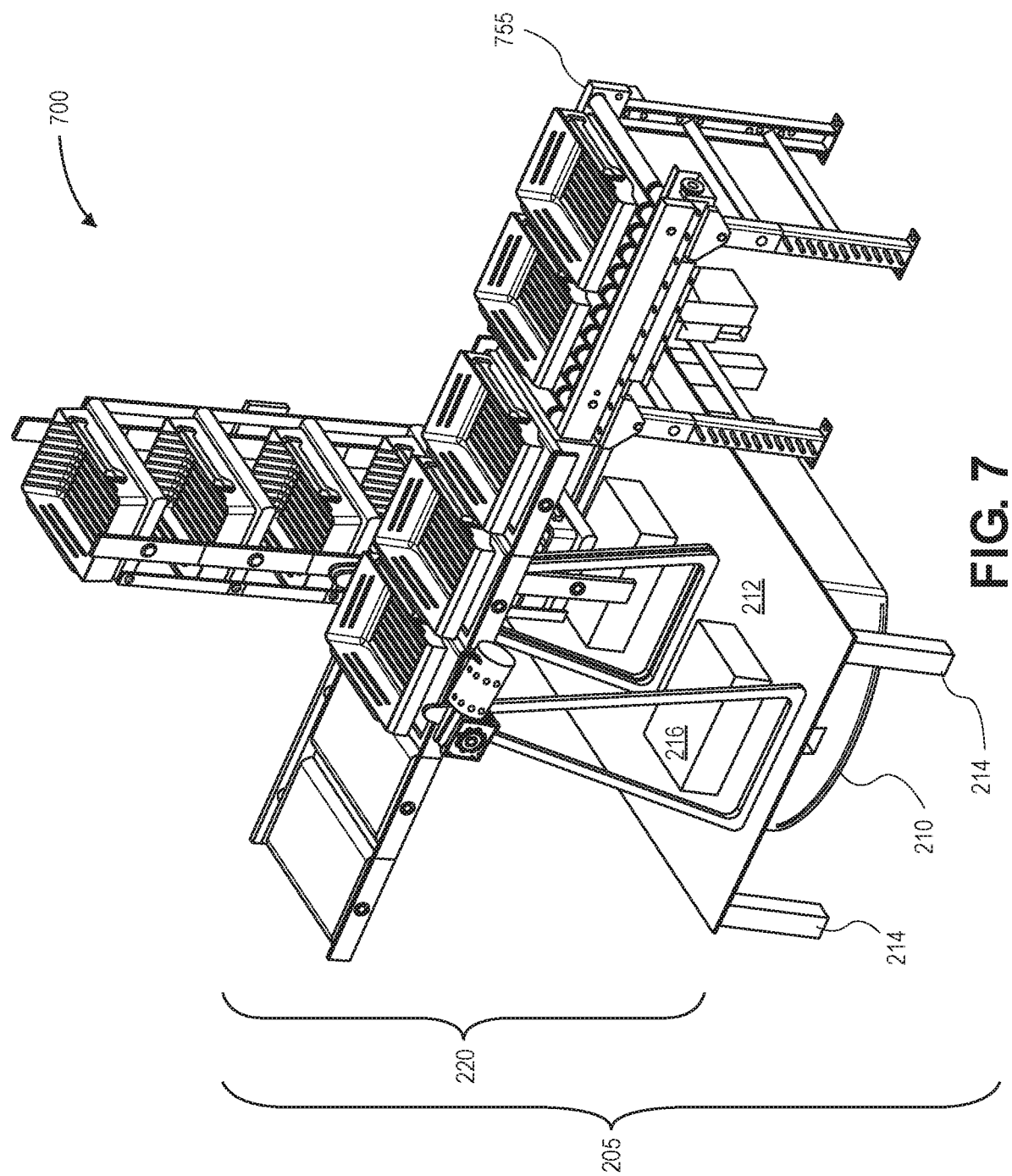
FIG. 7 is a schematic, perspective view diagram of an example mobile, rotatable, transport mechanism at a loading/unloading position, in accordance with implementations of the present disclosure.

FIG. 7 is a schematic, perspective view diagram 700 of an example mobile, rotatable, transport mechanism at a loading/unloading position, in accordance with implementations of the present disclosure. The example mobile, rotatable, transport mechanism 205 shown in FIG. 7 may be another example of the example transport mechanisms 105 shown in FIG. 1. In addition, example mobile, rotatable, transport mechanism 205 shown in FIG. 7 may include any and all of the features described herein with respect to the example transport mechanisms 105, 205 of FIGS. 1 and 2, and the example rotating carrier 220 shown in FIG. 7 may also include any and all of the features described herein with respect to the example rotating carriers 220, 320, or portions thereof, of FIGS. 2-6.

A robotic drive unit 210 may move an example transport mechanism 205 having a rotating carrier 220 by engaging, lifting, and moving a base 212 of the transport mechanism. As shown in FIG. 7, the robotic drive unit 210 may move the transport mechanism 205 to or from a transfer position 755 within an environment. For example, the transfer position 755 may comprise a portion of a conveyance or material handling equipment or system, and/or may be operatively connected to a station, such as an upstream or downstream item, tray, or tote processing station.

During transport to or from the transfer position 755, the rotating carrier 220 may be moved or rotated to the substantially vertical orientation, e.g., to prevent interference or collision with other portions of the environment. At the transfer position 755, the rotating carrier 220 may be moved or rotated to the substantially horizontal orientation to transfer items, trays, or totes between the rotating carrier 220 and the transfer position 755 within an environment. In the substantially horizontal orientation, the plurality of conveyor sections and associated items, trays, or totes may be substantially horizontally aligned with each other responsive to rotation of the rotating carrier 220 into the substantially horizontal orientation. Further, in the substantially horizontal orientation, the plurality of conveyor sections and associated items, trays, or totes may be maintained in a substantially flat horizontal orientation, or in a same relative orientation, due to one or more leveling mechanisms associated with the rotating carrier 220.

In example embodiments, one or more items, trays, or totes may be loaded onto one or more conveyor sections of the rotating carrier 220 at the transfer position 755 from one or more upstream stations or processes. In other example embodiments, one or more items, trays, or totes may be unloaded off of one or more conveyor sections of the rotating carrier 220 at the transfer position 755 to one or more downstream stations or processes.

Moreover, a control system (such as the control system described with respect to FIG. 13), may be in communication with each of the robotic drive units, processing stations, and/or conveyance or material handling equipment or systems within an environment, and may send and/or receive commands, instructions, and/or data to control or coordinate operations of the various components within the environment. For example, the control system may control, instruct, or coordinate operations of robotic drive units to move transport mechanisms between positions, to modify orientations, angles, heights, or other aspects of transport mechanisms, and/or other processes. In addition, the control system may control, instruct, or coordinate operations of robotic drive units, processing stations, and/or conveyance or material handling equipment or systems to facilitate movement of robotic drive units and transport mechanisms to and from transfer stations, to cause transfer of items, trays, or totes between transport mechanisms and transfer stations, and/or to facilitate various processes and operations associated with items, trays, and/or totes transported by the robotic drive units and transport mechanisms. Further details of the control system are described herein at least with respect to FIG. 13.

Figure 8:
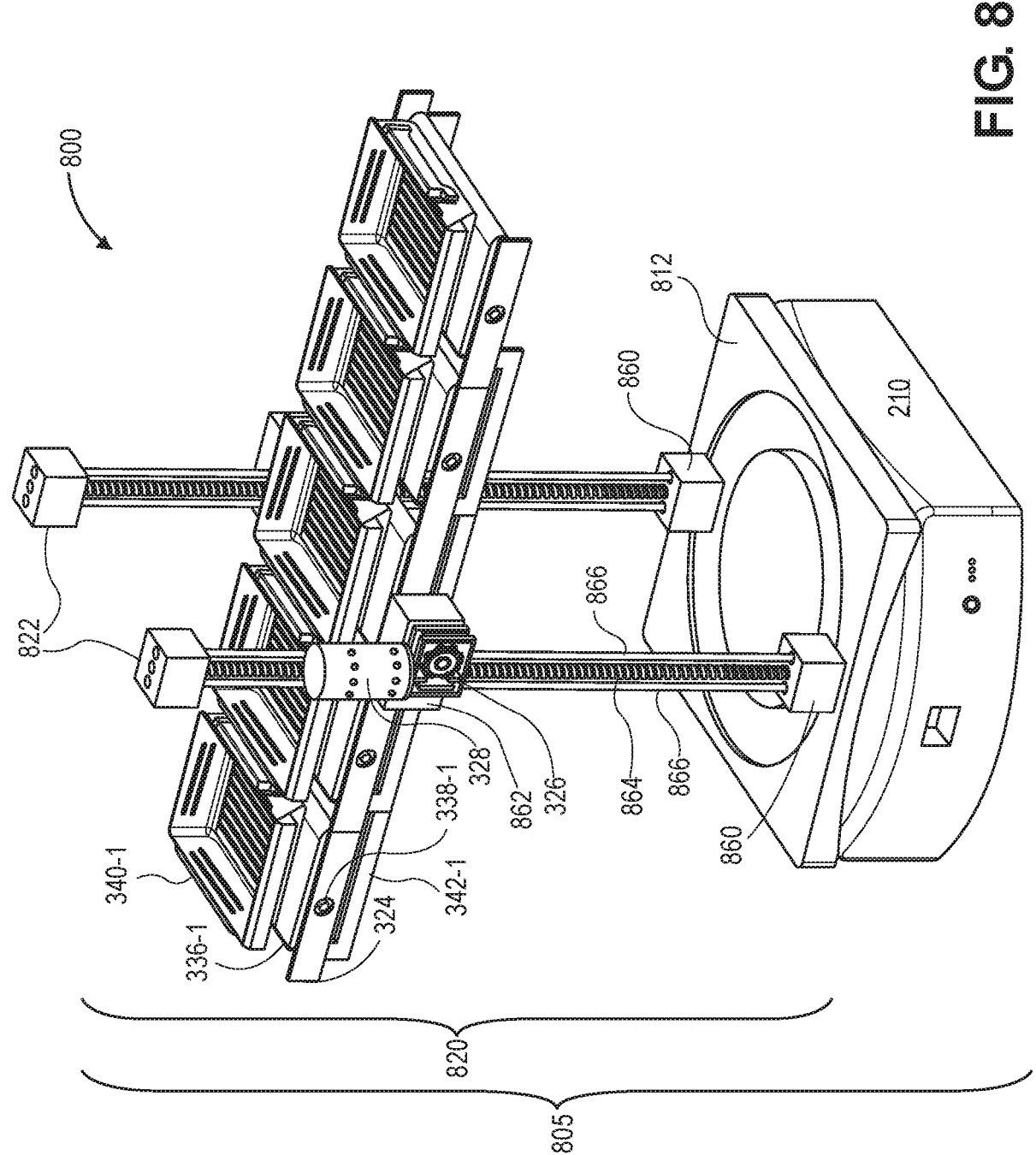
FIG. 8 is a schematic, perspective view diagram of another example mobile, rotatable, transport mechanism having an adjustable height mechanism, in accordance with implementations of the present disclosure.

FIG. 8 is a schematic, perspective view diagram 800 of another example mobile, rotatable, transport mechanism having an adjustable height mechanism, in accordance with implementations of the present disclosure. The example mobile, rotatable, transport mechanism 805 shown in FIG. 8 may be another example of the example transport mechanisms 105 shown in FIG. 1. In addition, example mobile, rotatable, transport mechanism 805 shown in FIG. 8 may include any and all of the features described herein with respect to the example transport mechanisms 105, 205 of FIGS. 1 and 2, and the example rotating carrier 820 shown in FIG. 8 may also include any and all of the features described herein with respect to the example rotating carriers 220, 320, or portions thereof, of FIGS. 2-7.

As shown in FIG. 8, an example mobile, rotatable, transport mechanism 805 may include a robotic drive unit 210, a base 812 (which may or may not include a plurality of legs), and a rotatable or rotating carrier 820 that may be coupled to the base 812.

The robotic drive unit 210 may include a lift mechanism and a controller (such as the control system described with respect to FIG. 12), that may include a processor, a drive mechanism controller, a power supply, a memory, a lift mechanism controller, and a network interface or communication device. In example embodiments, the lift mechanism may comprise screw drives, geared mechanisms, linear actuators, or other actuators or mechanisms configured to cause vertical movement of a portion of the robotic drive unit 210 and to engage and lift a base 812 of an example transport mechanism 805.

In example embodiments, the robotic drive unit 210 may releasably engage or couple to respective bases 812 of transport mechanisms, such that the robotic drive unit 210 may perform various tasks, such as coupling to, lifting, moving, lowering, placing, and uncoupling from respective bases 812 of transport mechanisms as desired. For example, in order to engage and move a respective base 812 and transport mechanism, a robotic drive unit 210 may position itself underneath the base 812. Then, the lift mechanism may move vertically to engage with an underside of the base 812 and lift the base 812 and transport mechanism. While the base 812 and transport mechanism is lifted via the lift mechanism, the robotic drive unit 210 may move or transport the base 812 and transport mechanism between various portions of an environment, e.g., between various transfer positions within the environment. Upon reaching a desired position or location for the transport mechanism, the lift mechanism may again move vertically to disengage with the underside of the base 812 and lower the base 812 and transport mechanism.

In other example embodiments, a robotic drive unit 210 may be fixedly coupled or mounted to a respective base 812 and transport mechanism, such that the robotic drive unit 210 may perform various tasks, such as lifting, moving, and lowering the fixedly coupled or mounted base 812 and transport mechanism as desired. In this manner, the robotic drive unit 210 may move or transport the fixedly coupled or mounted base 812 and transport mechanism between various portions of an environment, e.g., between various transfer positions within the environment.

Furthermore, the robotic drive unit 210 may include any and all of the features described herein with respect to such components, or portions thereof, at least with reference to FIGS. 1, 2, and 7.

In addition, as shown in FIG. 8, the base 812 (which may or may not include a plurality of legs, e.g., four legs) of an example transport mechanism 805 may have a substantially rectangular prism shape. The base 812 may be a substantially flat surface or plate on an upper surface of which is coupled one or more rotating carriers 820, and the one or more rotating carriers 820 may be coupled to the base 812 via fasteners, welds, brackets, and/or various other permanent, semi-permanent, or releasable connections. Further, the base 812 (which may or may not include a plurality of legs) may be formed from various materials, such as metals, plastics, composites, other materials, or combinations thereof.

Moreover, the engagement between the lift mechanism of a robotic drive unit 210 and the base 812 of a transport mechanism 805 may comprise electrical, power, and/or data connections between the robotic drive unit 210 and the transport mechanism 805. In example embodiments, one or more power sources and/or controllers associated with the robotic drive unit 210 (such as the control system described with respect to FIG. 12), may be operatively connected to the transport mechanism 805 via engagement with the base 812 to provide electrical, power, and/or data connections between the transport mechanism 805, the robotic drive unit 210, and/or a control system associated with the environment. For example, the power sources or controllers of the robotic drive unit 210 may provide power to the transport mechanism 805 and/or the robotic drive unit 810. In addition, the power sources or controllers of the robotic drive unit 210 may send and/or receive commands, instructions, and/or data between the transport mechanism 805, the robotic drive unit 210, and/or a control system associated with the environment (such as the control system described with respect to FIG. 13).

As shown in FIG. 8, the example rotating carrier 820 may include a frame 822, rotating arms 324, and a plurality of conveyor sections 336. The frame 822 may include a plurality of beams, poles, columns, struts, or other structures that are coupled to a base 812, e.g., via fasteners, welds, brackets, and/or various other permanent, semi-permanent, or releasable connections, and that support the rotating carrier 820 and the plurality of conveyor sections 336. In other example embodiments, the frame 822 may have other shapes or configurations, such as rectangular, box, single beam, multiple beams, parallel beams, triangular or A-frame, or other shapes, as long as the frame 822 provides structural support to the rotating carrier 820 and the plurality of conveyor sections 336. The frame 822 may comprise at least two portions that are positioned on opposite sides of the rotating carrier 820.

Each portion of the frame 822 may also include a height adjustment mechanism comprising a height adjustment actuator 860, e.g., a motor or other rotary actuator, a height adjustment drive train 862, a center screw or lead screw 864, and one or more guide shafts 866. The lead screw 864 and the one or more guide shafts 866 may extend substantially vertically from the base 812 of the example transport mechanism 805. In addition, the height adjustment actuator 860 may cause rotation of the lead screw 864 in either rotational direction. Further, the height adjustment drive train 862, or a portion thereof, may be coupled to the rotating arms 324, the drive train 326, the actuator 328, and/or portions thereof.

Figure 9:
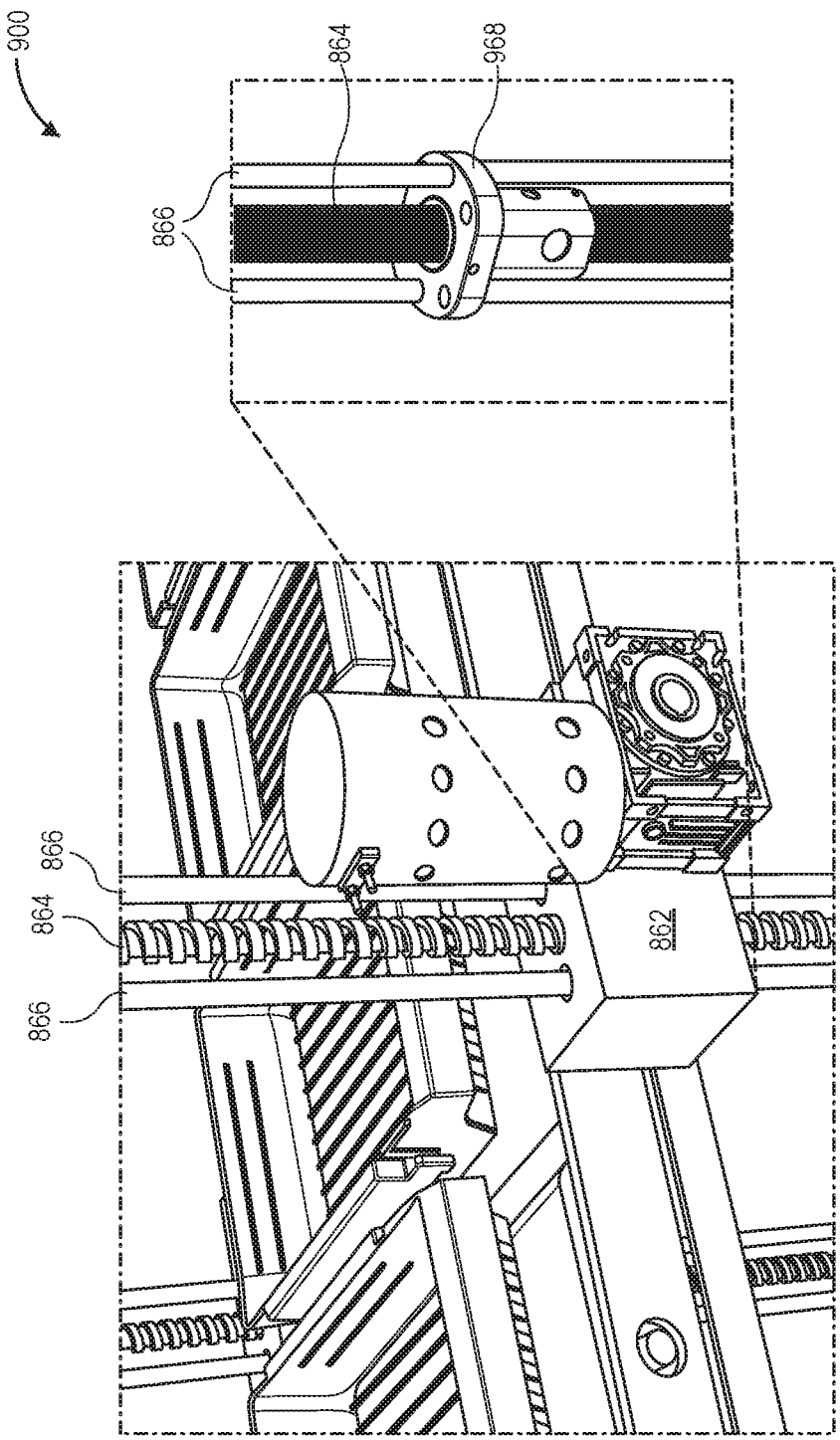
FIG. 9 is a schematic, partial, perspective view diagram, and a close-up, internal view diagram, of a portion of an example mobile, rotatable, transport mechanism having an adjustable height mechanism, in accordance with implementations of the present disclosure.

FIG. 9 is a schematic, partial, perspective view diagram, and a close-up, internal view diagram, 900 of a portion of an example mobile, rotatable, transport mechanism having an adjustable height mechanism, in accordance with implementations of the present disclosure.

As shown in more detail in FIG. 9, the height adjustment drive train 862 may include a height adjustment nut 968 that mates with the lead screw 864 and the one or more guide shafts 866. For example, the external threads of the lead screw 864 may be in threaded engagement with corresponding internal threads of the height adjustment nut 968. In addition, the height adjustment nut 968 may be in sliding engagement with the one or more guide shafts 866.

Responsive to rotation of the lead screw 864 by the height adjustment actuator 860, the height adjustment nut 968 may move substantially vertically due to the threaded engagement with the lead screw 864, as well as the sliding engagement with the one or more guide shafts 866. As a result of this substantially vertical movement, and due to the coupling or attachment between the height adjustment drive train 862 and a portion of the rotating arms 324, the drive train 326, and/or the actuator 328, the rotating arms 324 of the rotating carrier 820 may also move or translate substantially vertically. In particular, the height adjustment mechanism shown in FIGS. 8 and 9 may substantially prevent back-driving or spurious changes to height of the rotating arms 324 responsive to weight, loads, or other external forces that may be applied to the rotating arms 324 and associated conveyor sections 336.

In this manner, a height of the rotating arms 324 may be adjusted using the height adjustment mechanism described herein. By adjusting a height of the rotating arms 324, corresponding heights of the individual conveyor sections 336 and one or more objects, items, trays, or totes 340 received thereon may also be adjusted.

In other example embodiments, a height of the rotating arms 324 may be adjusted using various other types of mechanisms or actuators, such as other gear drives, chain drives, belt drives, scissor lift mechanisms, or other types of mechanisms or actuators. In some such example embodiments, the other types of mechanisms or actuators may also include one or more brakes, locks, or other devices to hold or maintain particular heights of the rotating arms 324 responsive to weight, loads, or other external forces that may be applied to the rotating arms 324 and associated conveyor sections 336.

In example embodiments, a height of the rotating arms 324 may be adjusted in the substantially vertical orientation of the rotating carrier 820 in order to facilitate transport of the example transport mechanism 805 within an environment. For example, the height of the rotating arms 324 may be at a lowest vertical height to lower a center of gravity of the example transport mechanism 805 and prevent tipping during transport. In additional example embodiments, a height of the rotating arms 324 may be adjusted in the substantially horizontal orientation of the rotating carrier 820 in order to facilitate alignment of the example transport mechanism 805 with one or more transfer positions within an environment. For example, the height of the rotating arms 324 may be raised, lowered, or otherwise adjusted to align individual conveyor sections 336 with a transfer position of a station, conveyor, and/or other processes. In further example embodiments, a height of the rotating arms 324 may be adjusted in any desired orientation of the rotating carrier 820 in order to facilitate alignment of the example transport mechanism 805 with one or more transfer positions within an environment. For example, the height of the rotating arms 324 may be raised, lowered, or otherwise adjusted, potentially in combination with corresponding adjustments to angled orientations of individual conveyor sections 336, as described herein, to align the individual conveyor sections 336 with a transfer position of a station, conveyor, and/or other processes along an angled, inclined, or declined direction or orientation.

Further, a particular height of the rotating arms 324 may be detected or determined using various sensors or other methods. For example, one or more photoeyes, proximity sensors, imaging sensors, or other types of position sensors may be associated with portions of the height adjustment mechanism, the frame 822, the rotating arms 324, and/or other portions of the rotating carrier 820 to measure or detect a current height of the rotating arms 324. In addition, encoders or other rotary position sensors may be associated with the height adjustment mechanism, the actuator 860, the height adjustment drive train 862, the lead screw 864, and/or the height adjustment nut 968 to measure or detect a current height of the rotating arms 324 based on measured or sensed rotation or movement of such components. Various other types of sensors or methods may also be used to detect or determine a current height of the rotating arms 324.

As described herein, the rotating arms 324, the drive train 326, the actuator 328, the plurality of conveyor sections 336, the plurality of objects, items, trays, or totes 340, the linkage arms 342 or other leveling mechanisms described herein, and/or the rotatable joints may include any and all of the features described herein with respect to such components, or portions thereof, at least with reference to FIGS. 1-7.

Although FIGS. 8 and 9 illustrate a particular number, configuration, and arrangement of a robotic drive unit, base, frame, height adjustment mechanism, and/or rotating carrier of an example transport mechanism, in other example embodiments, various other numbers, configurations, and arrangements of the various components or portions of an example transport mechanism may be included. For example, the base may have different sizes, shapes, or dimensions. In addition, other numbers of rotating carriers, e.g., one, two, or more, may be coupled to a base. Further, the sizes, shapes, dimensions, positions, orientations, and/or other aspects of the height adjustment mechanism and/or the rotating carrier may also be modified.

In other example embodiments, in addition to or instead of moving the example transport mechanisms described herein between generally discrete transfer positions within an environment in order to transfer items, trays, or totes therebetween, one or more example transport mechanisms may be positioned and oriented within the environment to form a temporary, on-demand conveyance mechanism or system. For example, a plurality of example transport mechanisms may be positioned or oriented substantially along a line, curve, or arc within the environment, and the plurality of example transport mechanisms may be moved or rotated to substantially horizontal orientations in order to align their respective conveyor sections, such that the plurality of example transport mechanisms may substantially form, temporarily and on-demand, a conveyance mechanism or system between two positions within the environment. Further, by aligning or connecting a plurality of example transport mechanisms in various other shapes, configurations, or arrangements, various other temporary conveyance mechanisms or systems may be temporarily formed between a plurality of positions within the environment. Moreover, adjustments to height and/or angles of the rotating carriers and/or individual conveyor sections may also be included in such temporary conveyance mechanisms or systems to enable still further variations with respect to the shapes, configurations, or arrangements of such systems.

In further example embodiments, an example transport mechanism may include a rotating carrier as described herein, which may be referred to as a primary rotating carrier. In addition, the primary rotating carrier may include one or more nested rotating carriers within the primary rotating carrier. For example, the primary rotating carrier may include primary rotating arms that move between a plurality of orientations, including substantially vertical and substantially horizontal orientations. Coupled to the primary rotating arms may be one or more nested rotating carriers that include nested rotating arms that may also move between a plurality of orientations. Moreover, the nested rotating arms may move or rotate relative to the primary rotating arms, and two or more nested conveyor sections may be coupled to and rotated by the nested rotating arms.

Such nested configurations of a primary rotating carrier and one or more nested rotating carriers may enable rotation of the nested rotating carriers independently of rotation of the primary rotating carrier. In addition, as the nested rotating carriers rotate, the two or more nested conveyor sections coupled to the nested rotating arms may rotate relative to each other. In this manner, nested configurations may enable sortation, reordering, or rearrangement of nested conveyor sections, and items, trays, or totes received thereon, while such items, trays, or totes are carried or held by the example transport mechanisms.

In a simple example, a nested rotating carrier having two nested conveyor sections may load a first tray and a second tray in that order, from a first side of the nested rotating carrier, e.g., from one or more adjacent primary conveyor sections. Then, by rotating the nested rotating carrier approximately one hundred and eighty degrees, the nested rotating carrier may unload the first tray and the second tray in that order again, to the same first side of the nested rotating carrier, e.g., to one or more adjacent primary conveyor sections. In more complex examples having a plurality of nested rotating carriers with nested conveyor sections associated with a primary rotating carrier, various other sortation, reordering, or rearrangement of the received items, trays, or totes may be performed.

Thus, whereas an example transport mechanism having a primary rotating carrier and a plurality of conveyor sections may generally function as a stack or queue of received items, trays, or totes, that may be unloaded in substantially the same order, or in a reverse order, as the initial loading of such items, trays, or totes, example transport mechanisms having one or more nested rotating carriers with associated nested conveyor sections may modify or adjust the order or arrangement of received items, trays, or totes, such that the items, trays, or totes may be unloaded in an order that is different from the order in which the items, trays, or totes were initially loaded onto the example transport mechanisms having one or more nested rotating carriers, thereby enabling on-the-fly sortation of items, trays, or totes carried by example transport mechanisms.

Figure 10A:
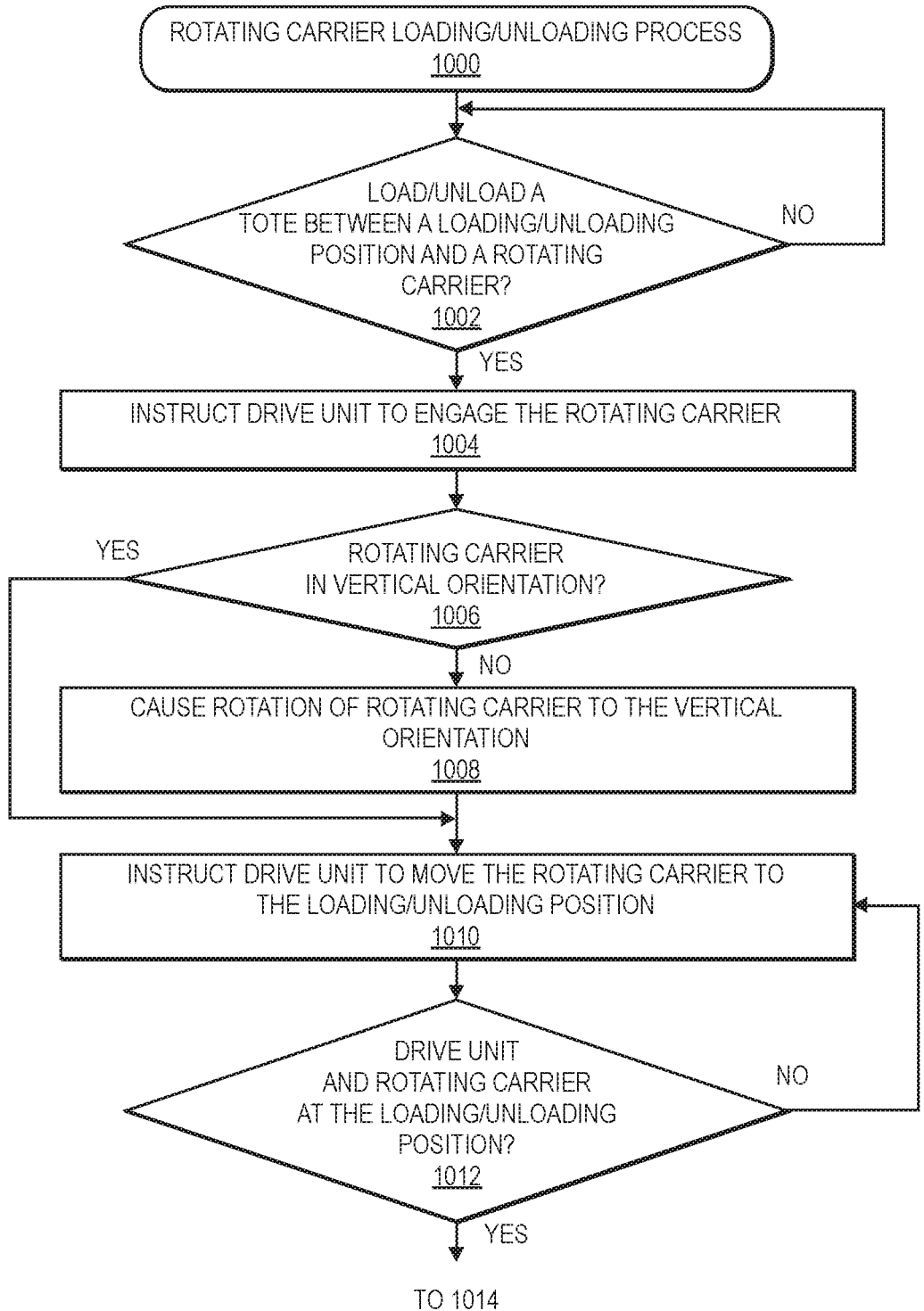
FIGS. 10A and 10B is a flow diagram illustrating an example rotating carrier loading/unloading process, in accordance with implementations of the present disclosure.
Figure 10B:
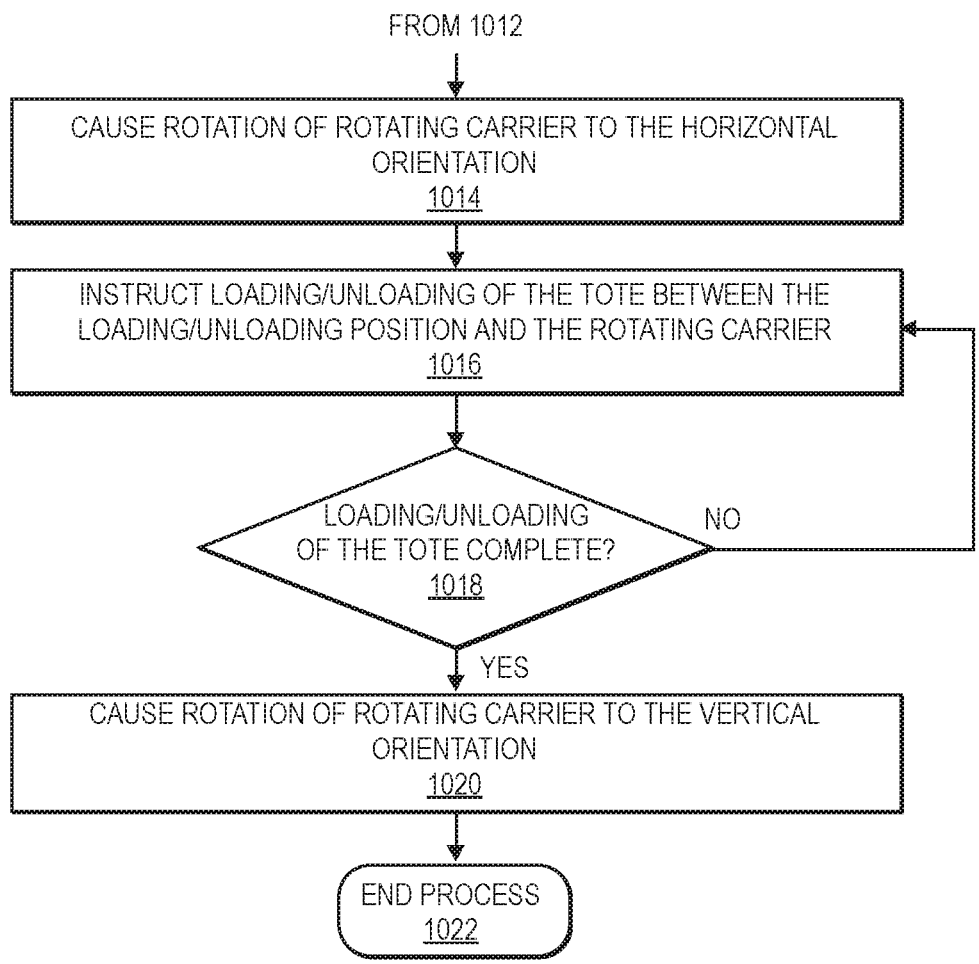

FIGS. 10A and 10B is a flow diagram illustrating an example rotating carrier loading/unloading process 1000, in accordance with implementations of the present disclosure.

The process 1000 may begin by determining whether to load/unload a tote between a loading/unloading position and a rotating carrier, as at 1002. For example, it may be determined whether a tote at a first transfer position, e.g., a first station, conveyor, or process, should be loaded onto a rotating carrier, and/or whether a tote should be unloaded from a rotating carrier at a second transfer position, e.g., a second station, conveyor, or process. Further, a control system may instruct or command the various operations associated with determining whether to transfer a tote between a transfer position and a rotating carrier.

If a tote is not to be loaded or unloaded between a transfer position and a rotating carrier, then the process 1000 may wait and continue to monitor, as at 1002, for determinations or requests for such transfers.

If, however, a tote is to be loaded or unloaded between a transfer position and a rotating carrier, then the process 1000 may continue by instructing a drive unit to engage the rotating carrier, as at 1004. For example, a robotic drive unit may travel under, engage, and lift the rotating carrier to transfer the tote, or a robotic drive unit may already be under and engaged with the rotating carrier to transfer the tote. In addition, the robotic drive unit may be selected from a plurality of robotic drive units to transfer the tote, e.g., based on location, capabilities, available power, or other aspects of the robotic drive unit. Moreover, by identifying, detecting, and following fiducial markers associated with a floor or surface within the environment, the robotic drive unit may move to a location of the rotating carrier within the environment. Further, a control system may instruct or command the various operations associated with instructing a drive unit to engage a rotating carrier.

The process 1000 may then proceed by determining whether the rotating carrier is in the vertical orientation, as at 1006. For example, responsive to engagement between the robotic drive unit and the rotating carrier, data and/or information may be sent and/or received therebetween in order to determine a current orientation of the rotating carrier, which may be detected or measured by one or more sensors as described herein. In addition, a current orientation of the rotating carrier may be stored in memory of a control system and may be communicated to the robotic drive unit and/or the rotating carrier. In example embodiments, the rotating carrier may generally be transported and/or stored within an environment in the substantially vertical orientation to prevent interference or collision with other portions of the environment. Further, a control system may instruct or command the various operations associated with determining a current orientation of the rotating carrier.

If the rotating carrier is not in the vertical orientation, then the process 1000 may continue to cause rotation of the rotating carrier to the vertical orientation, as at 1008. For example, responsive to engagement between the robotic drive unit and the rotating carrier, power, instructions, commands, and/or data may be sent and/or received therebetween in order to cause rotation of the rotating carrier to the substantially vertical orientation. An actuator associated with the rotating carrier may be instructed to move or rotate the rotating arms to the substantially vertical orientation, which may be detected or measured by one or more sensors as described herein. Further, a control system may instruct or command the various operations associated with causing rotation of the rotating carrier to the substantially vertical orientation.

If the rotating carrier is already in the vertical orientation, as at 1006, or after causing rotation of the rotating carrier to the vertical orientation, as at 1008, the process 1000 may proceed to instruct the drive unit to move the rotating carrier to the loading/unloading position, as at 1010. For example, the robotic drive unit may transport the rotating carrier to the transfer position within the environment to transfer the tote. In addition, by identifying, detecting, and following fiducial markers associated with a floor or surface within the environment, the robotic drive unit may move to a location of the transfer position within the environment. Further, a control system may instruct or command the various operations associated with instructing a drive unit to move the rotating carrier to the transfer position.

The process 1000 may then continue with determining whether the drive unit and rotating carrier are at the loading/unloading position, as at 1012. For example, by identifying, detecting, and following fiducial markers associated with a floor or surface within the environment, the robotic drive unit may determine whether it has arrived at a location of the transfer position within the environment. Further, a control system may instruct or command the various operations associated with determining whether a drive unit and rotating carrier have arrived at the transfer position.

If the drive unit and rotating carrier have not yet arrived at the transfer position, then the process 1000 may continue to instruct the drive unit to move the rotating carrier to the transfer position, as at 1010.

If, however, the drive unit and rotating carrier have arrived at the transfer position, then the process 1000 may proceed with causing rotation of the rotating carrier to the horizontal orientation, as at 1014. For example, responsive to arriving at a location of the transfer position, power, instructions, commands, and/or data may be sent and/or received between the robotic drive unit and the rotating carrier in order to cause rotation of the rotating carrier to the substantially horizontal orientation to align the rotating carrier and the transfer position. An actuator associated with the rotating carrier may be instructed to move or rotate the rotating arms to the substantially horizontal orientation, which may be detected or measured by one or more sensors as described herein. Further, a control system may instruct or command the various operations associated with causing rotation of the rotating carrier to the substantially horizontal orientation.

The process 1000 may then continue by instructing loading/unloading of the tote between the loading/unloading position and the rotating carrier, as at 1016. For example, a tote at the transfer position may be loaded onto the rotating carrier, and/or a tote may be unloaded from the rotating carrier to the transfer position. In addition, power, instructions, commands, and/or data may be sent and/or received between the robotic drive unit and the rotating carrier in order to actuate one or more conveyor sections of the rotating carrier to transfer the tote, which may be detected or measured by one or more sensors as described herein, and/or one or more conveyance or material handling machines or systems associated with the transfer position may also actuate to transfer the tote. Further, a control system may instruct or command the various operations associated with transferring a tote between a transfer position and a rotating carrier.

The process 1000 may proceed by determining whether loading or unloading of the tote is complete, as at 1018. For example, the transfer of the tote between the rotating carrier and the transfer position may be detected or measured by one or more sensors as described herein. Further, a control system may instruct or command the various operations associated with determining whether transfer of the tote is complete.

If it is determined that the transfer of the tote has not completed, then the process 1000 may continue to instruct transfer of the tote between the transfer position and the rotating carrier, as at 1016.

If, however, it is determined that the transfer of the tote has completed, then the process 1000 may continue to cause rotation of the rotating carrier to the vertical orientation, as at 1020. For example, power, instructions, commands, and/or data may be sent and/or received between the robotic drive unit and the rotating carrier in order to cause rotation of the rotating carrier to the substantially vertical orientation. An actuator associated with the rotating carrier may be instructed to move or rotate the rotating arms to the substantially vertical orientation, which may be detected or measured by one or more sensors as described herein. In example embodiments, the rotating carrier may generally be transported and/or stored within an environment in the substantially vertical orientation to prevent interference or collision with other portions of the environment. Further, a control system may instruct or command the various operations associated with causing rotation of the rotating carrier to the substantially vertical orientation.

The process 1000 may then end, as at 1022.

Figure 11A:
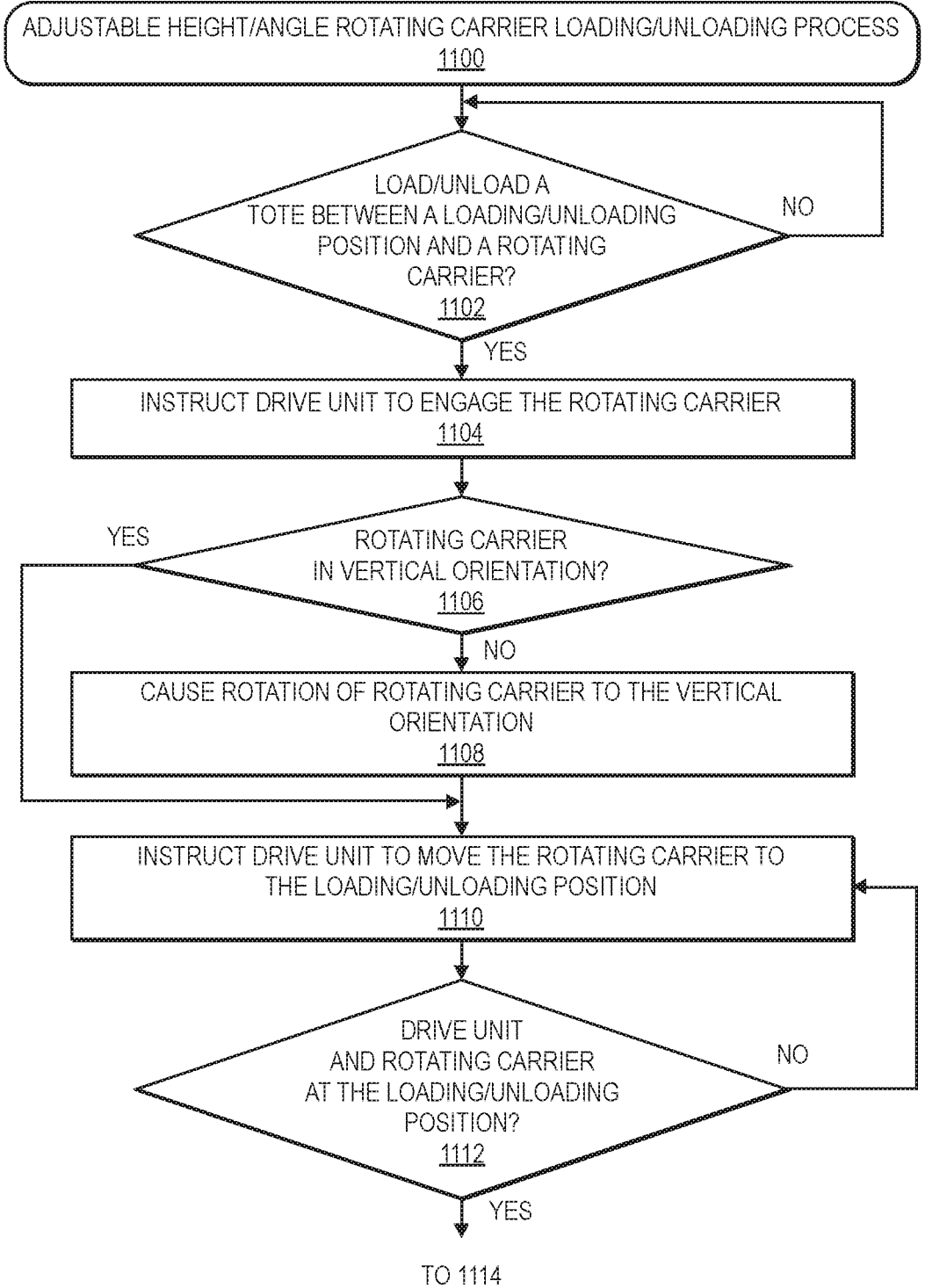
FIGS. 11A and 11B is a flow diagram illustrating an example adjustable height/angle rotating carrier loading/unloading process, in accordance with implementations of the present disclosure.
Figure 11B:
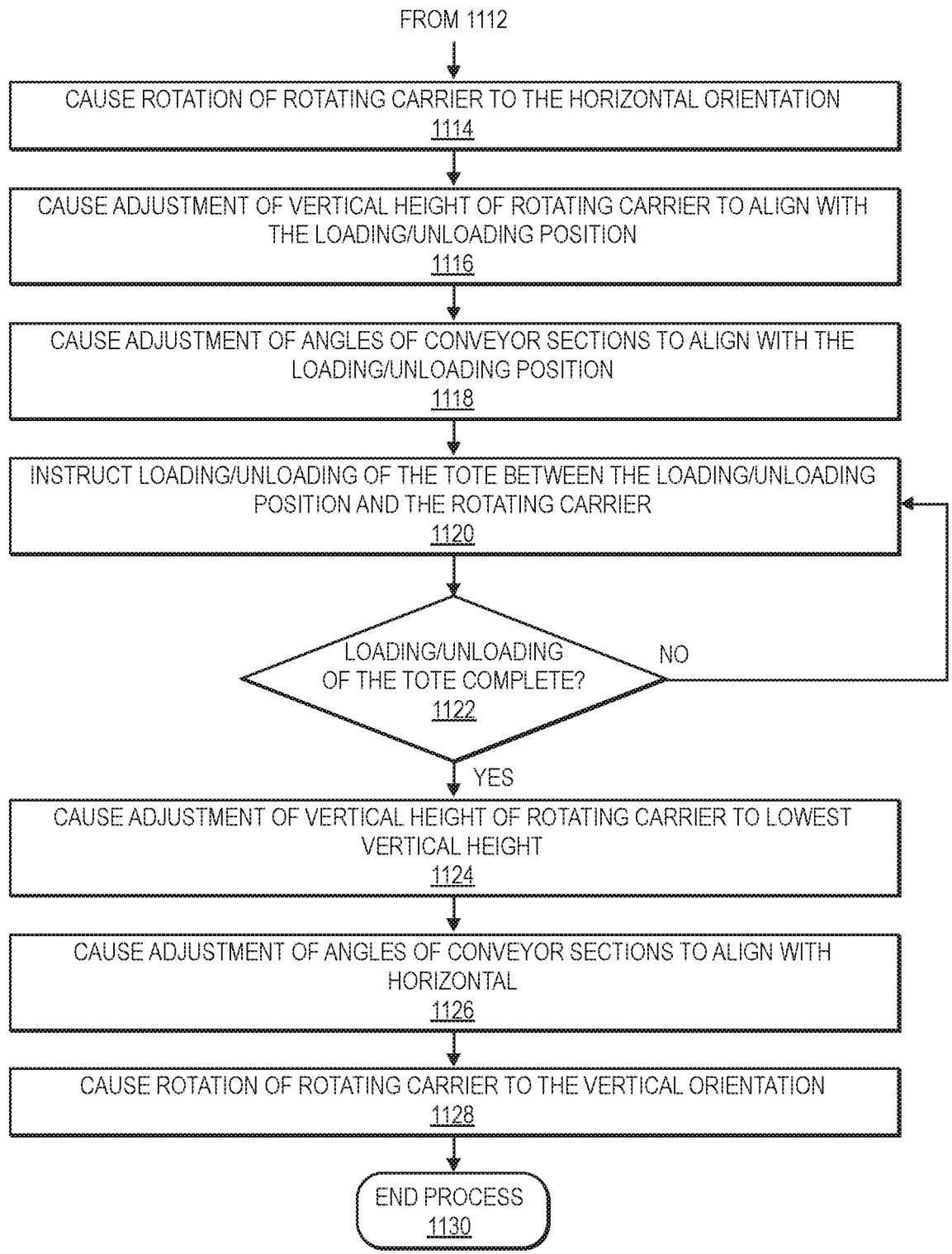

FIGS. 11A and 11B is a flow diagram illustrating an example adjustable height/angle rotating carrier loading/unloading process 1100, in accordance with implementations of the present disclosure.

The process 1100 may begin by determining whether to load/unload a tote between a loading/unloading position and a rotating carrier, as at 1102. For example, it may be determined whether a tote at a first transfer position, e.g., a first station, conveyor, or process, should be loaded onto a rotating carrier, and/or whether a tote should be unloaded from a rotating carrier at a second transfer position, e.g., a second station, conveyor, or process. Further, a control system may instruct or command the various operations associated with determining whether to transfer a tote between a transfer position and a rotating carrier.

If a tote is not to be loaded or unloaded between a transfer position and a rotating carrier, then the process 1100 may wait and continue to monitor, as at 1102, for determinations or requests for such transfers.

If, however, a tote is to be loaded or unloaded between a transfer position and a rotating carrier, then the process 1100 may continue by instructing a drive unit to engage the rotating carrier, as at 1104. For example, a robotic drive unit may travel under, engage, and lift the rotating carrier to transfer the tote, or a robotic drive unit may already be under and engaged with the rotating carrier to transfer the tote. In addition, the robotic drive unit may be selected from a plurality of robotic drive units to transfer the tote, e.g., based on location, capabilities, available power, or other aspects of the robotic drive unit. Moreover, by identifying, detecting, and following fiducial markers associated with a floor or surface within the environment, the robotic drive unit may move to a location of the rotating carrier within the environment. Further, a control system may instruct or command the various operations associated with instructing a drive unit to engage a rotating carrier.

The process 1100 may then proceed by determining whether the rotating carrier is in the vertical orientation, as at 1106. For example, responsive to engagement between the robotic drive unit and the rotating carrier, data and/or information may be sent and/or received therebetween in order to determine a current orientation of the rotating carrier, which may be detected or measured by one or more sensors as described herein. In addition, a current orientation of the rotating carrier may be stored in memory of a control system and may be communicated to the robotic drive unit and/or the rotating carrier. In example embodiments, the rotating carrier may generally be transported and/or stored within an environment in the substantially vertical orientation to prevent interference or collision with other portions of the environment. Further, a control system may instruct or command the various operations associated with determining a current orientation of the rotating carrier.

If the rotating carrier is not in the vertical orientation, then the process 1100 may continue to cause rotation of the rotating carrier to the vertical orientation, as at 1108. For example, responsive to engagement between the robotic drive unit and the rotating carrier, power, instructions, commands, and/or data may be sent and/or received therebetween in order to cause rotation of the rotating carrier to the substantially vertical orientation. An actuator associated with the rotating carrier may be instructed to move or rotate the rotating arms to the substantially vertical orientation, which may be detected or measured by one or more sensors as described herein. Further, a control system may instruct or command the various operations associated with causing rotation of the rotating carrier to the substantially vertical orientation.

If the rotating carrier is already in the vertical orientation, as at 1106, or after causing rotation of the rotating carrier to the vertical orientation, as at 1108, the process 1100 may proceed to instruct the drive unit to move the rotating carrier to the loading/unloading position, as at 1110. For example, the robotic drive unit may transport the rotating carrier to the transfer position within the environment to transfer the tote. In addition, by identifying, detecting, and following fiducial markers associated with a floor or surface within the environment, the robotic drive unit may move to a location of the transfer position within the environment. Further, a control system may instruct or command the various operations associated with instructing a drive unit to move the rotating carrier to the transfer position.

The process 1100 may then continue with determining whether the drive unit and rotating carrier are at the loading/unloading position, as at 1112. For example, by identifying, detecting, and following fiducial markers associated with a floor or surface within the environment, the robotic drive unit may determine whether it has arrived at a location of the transfer position within the environment. Further, a control system may instruct or command the various operations associated with determining whether a drive unit and rotating carrier have arrived at the transfer position.

If the drive unit and rotating carrier have not yet arrived at the transfer position, then the process 1100 may continue to instruct the drive unit to move the rotating carrier to the transfer position, as at 1110.

If, however, the drive unit and rotating carrier have arrived at the transfer position, then the process 1100 may proceed with causing rotation of the rotating carrier to the horizontal orientation, as at 1114. For example, responsive to arriving at a location of the transfer position, power, instructions, commands, and/or data may be sent and/or received between the robotic drive unit and the rotating carrier in order to cause rotation of the rotating carrier to the substantially horizontal orientation to align the rotating carrier and the transfer position. An actuator associated with the rotating carrier may be instructed to move or rotate the rotating arms to the substantially horizontal orientation, which may be detected or measured by one or more sensors as described herein. In example embodiments, the substantially horizontal orientation may comprise various angled orientations relative to horizontal, in which case adjustments to vertical height and/or angles of the conveyor sections may be used to further align the rotating carrier with the transfer position. Further, a control system may instruct or command the various operations associated with causing rotation of the rotating carrier to the substantially horizontal orientation.

The process 1100 may continue by causing adjustment of a vertical height of the rotating carrier to align with the loading/unloading position, as at 1116. For example, responsive to arriving at a location of the transfer position, power, instructions, commands, and/or data may be sent and/or received between the robotic drive unit and the rotating carrier in order to cause adjustment of the height of the rotating carrier to align the rotating carrier and the transfer position. A height adjustment mechanism and actuator associated with the rotating carrier may be instructed to move or translate the rotating arms to the desired height, which may be detected or measured by one or more sensors as described herein. Further, a control system may instruct or command the various operations associated with causing adjustment of a vertical height of the rotating carrier to align with the transfer position.

The process 1100 may proceed by causing adjustment of angles of conveyor sections to align with the loading/unloading position, as at 1118. For example, responsive to arriving at a location of the transfer position, power, instructions, commands, and/or data may be sent and/or received between the robotic drive unit and the rotating carrier in order to cause adjustment of the angles of the conveyor sections of the rotating carrier to align the conveyor sections and the transfer position. A leveling mechanism and associated angle control actuator associated with the rotating carrier may be instructed to move or rotate the conveyor sections to the desired angled orientation, which may be detected or measured by one or more sensors as described herein. Further, a control system may instruct or command the various operations associated with causing adjustment of angles of conveyor sections of the rotating carrier to align with the transfer position.

The process 1100 may then continue to instruct loading/unloading of the tote between the loading/unloading position and the rotating carrier, as at 1120. For example, a tote at the transfer position may be loaded onto the rotating carrier, and/or a tote may be unloaded from the rotating carrier to the transfer position. In addition, power, instructions, commands, and/or data may be sent and/or received between the robotic drive unit and the rotating carrier in order to actuate one or more conveyor sections of the rotating carrier to transfer the tote, which may be detected or measured by one or more sensors as described herein, and/or one or more conveyance or material handling machines or systems associated with the transfer position may also actuate to transfer the tote. Further, a control system may instruct or command the various operations associated with transferring a tote between a transfer position and a rotating carrier.

The process 1100 may proceed to determine whether loading or unloading of the tote is complete, as at 1122. For example, the transfer of the tote between the rotating carrier and the transfer position may be detected or measured by one or more sensors as described herein. Further, a control system may instruct or command the various operations associated with determining whether transfer of the tote is complete.

If it is determined that the transfer of the tote has not completed, then the process 1100 may continue to instruct transfer of the tote between the transfer position and the rotating carrier, as at 1120.

If, however, it is determined that the transfer of the tote has completed, then the process 1100 may continue with causing adjustment of a vertical height of the rotating carrier to a lowest vertical height, as at 1124. For example, power, instructions, commands, and/or data may be sent and/or received between the robotic drive unit and the rotating carrier in order to cause adjustment of the height of the rotating carrier to a lowest vertical height, or any other desired height for transport and/or storage. A height adjustment mechanism and actuator associated with the rotating carrier may be instructed to move or translate the rotating arms to the desired height, which may be detected or measured by one or more sensors as described herein. Further, a control system may instruct or command the various operations associated with causing adjustment of a vertical height of the rotating carrier to a desired height.

The process 1100 may then proceed with causing adjustment of angles of conveyor sections to align with the horizontal, as at 1126. For example, power, instructions, commands, and/or data may be sent and/or received between the robotic drive unit and the rotating carrier in order to cause adjustment of the angles of the conveyor sections of the rotating carrier to substantially flat horizontal orientations for transport and/or storage. A leveling mechanism and associated angle control actuator associated with the rotating carrier may be instructed to move or rotate the conveyor sections to the desired angled orientation, which may be detected or measured by one or more sensors as described herein. Further, a control system may instruct or command the various operations associated with causing adjustment of angles of conveyor sections of the rotating carrier to align with the horizontal.

The process 1100 may continue by causing rotation of the rotating carrier to the vertical orientation, as at 1128. For example, power, instructions, commands, and/or data may be sent and/or received between the robotic drive unit and the rotating carrier in order to cause rotation of the rotating carrier to the substantially vertical orientation. An actuator associated with the rotating carrier may be instructed to move or rotate the rotating arms to the substantially vertical orientation, which may be detected or measured by one or more sensors as described herein. In example embodiments, the rotating carrier may generally be transported and/or stored within an environment in the substantially vertical orientation, at a lowest vertical height, and with conveyor sections in substantially flat horizontal orientations, in order to prevent interference or collision with other portions of the environment, to lower a center of gravity of the rotating carrier and avoid tipping, and to prevent items, trays, or totes from falling off the rotating carrier. Further, a control system may instruct or command the various operations associated with causing rotation of the rotating carrier to the substantially vertical orientation.

The process 1100 may then end, as at 1130.

Figure 12:
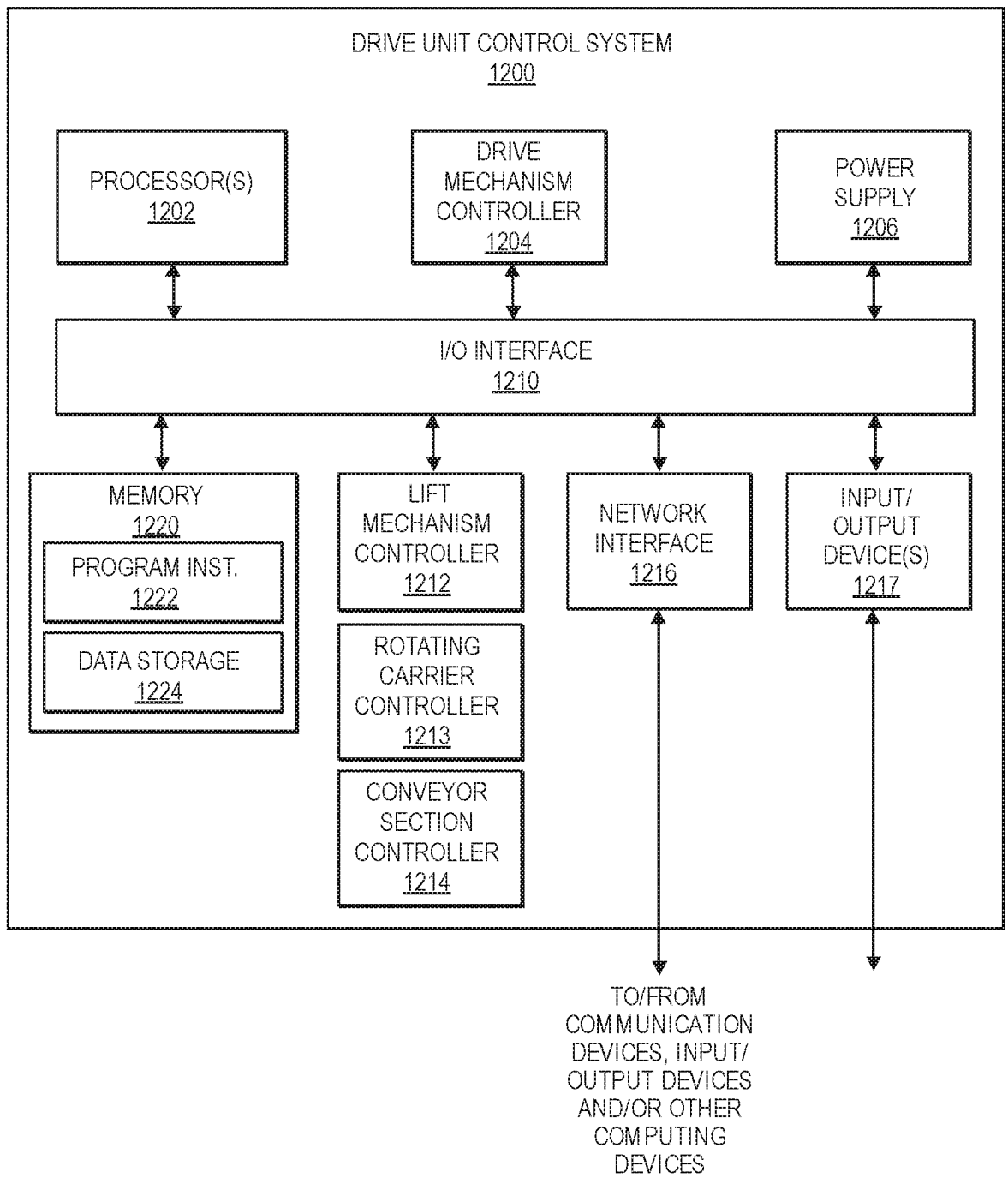
FIG. 12 is a block diagram illustrating various components of an example drive unit control system, in accordance with implementations of the present disclosure.

FIG. 12 is a block diagram illustrating various components of an example drive unit control system 1200, in accordance with implementations of the present disclosure.

In various examples, the block diagram may be illustrative of one or more aspects of a robotic drive unit controller or control system 1200 that may be used to implement the various systems and processes discussed above. In the illustrated implementation, the drive unit control system 1200 includes one or more processors 1202, coupled to a non-transitory computer readable storage medium 1220 via an input/output (I/O) interface 1210. The drive unit control system 1200 may also include a drive mechanism controller 1204 and a power supply or battery 1206. The drive unit control system 1200 may further include a lift mechanism controller 1212, a rotating carrier controller 1213, a conveyor section controller 1214, a network interface 1216, and one or more input/output devices 1217.

In various implementations, the drive unit control system 1200 may be a uniprocessor system including one processor 1202, or a multiprocessor system including several processors 1202 (e.g., two, four, eight, or another suitable number).

The processor(s) 1202 may be any suitable processor capable of executing instructions. For example, in various implementations, the processor(s) 1202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1202 may commonly, but not necessarily, implement the same ISA.

The non-transitory computer readable storage medium 1220 may be configured to store executable instructions, applications, drivers, and/or data, such as drive unit data, drive mechanism data, lift mechanism data, path or destination data, position or location data, fiducial marker data, station data, transport mechanism data, rotating carrier data, height adjustment mechanism data, conveyor section data, leveling mechanism data, item, tray, or tote data, sensor data, and/or other data items accessible by the processor(s) 1202. In various implementations, the non-transitory computer readable storage medium 1220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1220 as program instructions 1222 and data storage 1224. In other implementations, program instructions, applications, drivers, and/or data may be received, sent or stored upon different types of computer-accessible media, such as non-transitory media, or on similar media separate from the non-transitory computer readable storage medium 1220 or the drive unit control system 1200.

Generally, a non-transitory, computer readable storage medium may include storage media or memory media such as magnetic or optical media, e.g., disk or CD/DVD-ROM, coupled to the drive unit control system 1200 via the I/O interface 1210. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 1216.

In one implementation, the I/O interface 1210 may be configured to coordinate I/O traffic between the processor(s) 1202, the non-transitory computer readable storage medium 1220, and any peripheral devices, the network interface 1216 or other peripheral interfaces, such as input/output devices 1217. In some implementations, the I/O interface 1210 may perform any necessary protocol, timing or other data transformations to convert data signals from one component (e.g., non-transitory computer readable storage medium 1220) into a format suitable for use by another component (e.g., processor(s) 1202). In some implementations, the I/O interface 1210 may include support for devices attached through various types of peripheral buses, such as a variant of the Peripheral Component Interconnect (PCI) bus standard or the Universal Serial Bus (USB) standard, for example. In some implementations, the function of the I/O interface 1210 may be split into two or more separate components, such as a north bridge and a south bridge, for example. Also, in some implementations, some or all of the functionality of the I/O interface 1210, such as an interface to the non-transitory computer readable storage medium 1220, may be incorporated directly into the processor(s) 1202.

The drive mechanism controller 1204 may communicate with the processor(s) 1202, the non-transitory computer readable storage medium 1220, and/or other components described herein to adjust the operational characteristics of motors or other actuators associated with each drive mechanism to move the drive unit along a determined path to a destination and/or to perform other navigational maneuvers or operations.

The drive unit control system 1200 may also include a lift mechanism controller 1212 that communicates with the processor(s) 1202, the non-transitory computer readable storage medium 1220, and/or other components described herein to engage, lift, move, lower, disengage, and/or place respective transport mechanisms carried by the drive unit.

The drive unit control system 1200 may also include a rotating carrier controller 1213 that communicates with the processor(s) 1202, the non-transitory computer readable storage medium 1220, and/or other components described herein to move or rotate the rotating arms and conveyor sections. In addition, the rotating carrier controller 1213 may also instruct adjustment of a vertical height of the rotating arms and conveyor sections via a height adjustment mechanism and associated actuator.

The drive unit control system 1200 may also include a conveyor section controller 1214 that communicates with the processor(s) 1202, the non-transitory computer readable storage medium 1220, and/or other components described herein to instruct or move the conveyor sections to transfer items, trays, or totes on or off the conveyor sections. In addition, the conveyor section controller 1214 may also instruct adjustment of a desired angle of the conveyor sections via a leveling mechanism and associated angle control actuator.

The network interface 1216 may be configured to allow data to be exchanged between the drive unit control system 1200, other devices attached to a network, such as other computer systems, material handling facility system controllers, processing stations, control systems of other drive units, and/or other vehicles, systems, machines, equipment, apparatuses, systems, sensors, or devices associated with the environment. For example, the network interface 1216 may enable wireless communication between numerous drive units. In various implementations, the network interface 1216 may support communication via wireless general data networks, such as a Wi-Fi network. For example, the network interface 1216 may support communication via telecommunications networks such as cellular communication networks, satellite networks, and the like.

Input/output devices 1217 may, in some implementations, include one or more visual input/output devices, audio input/output devices, displays, imaging sensors, thermal sensors, infrared sensors, time of flight sensors, accelerometers, various other sensors described herein, etc. Multiple input/output devices 1217 may be present and controlled by the drive unit control system 1200. One or more of these sensors may be utilized to assist in performing the various functions, operations, and processes described herein.

As shown in FIG. 12, the memory may include program instructions 1222 which may be configured to implement the example processes and/or sub-processes described above. The data storage 1224 may include various data stores for maintaining data items that may be provided for performing the various functions, operations, and processes described herein. For example, the data storage 1224 may include drive unit data, drive mechanism data, lift mechanism data, path or destination data, position or location data, fiducial marker data, station data, transport mechanism data, rotating carrier data, height adjustment mechanism data, conveyor section data, leveling mechanism data, item, tray, or tote data, sensor data, and/or other data items.

Those skilled in the art will appreciate that the drive unit control system 1200 is merely illustrative and is not intended to limit the scope of the present disclosure. In particular, the computing system and devices may include any combination of hardware or software that can perform the indicated functions, including other control systems or controllers, computers, network devices, robotic devices, etc. The drive unit control system 1200 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Figure 13:
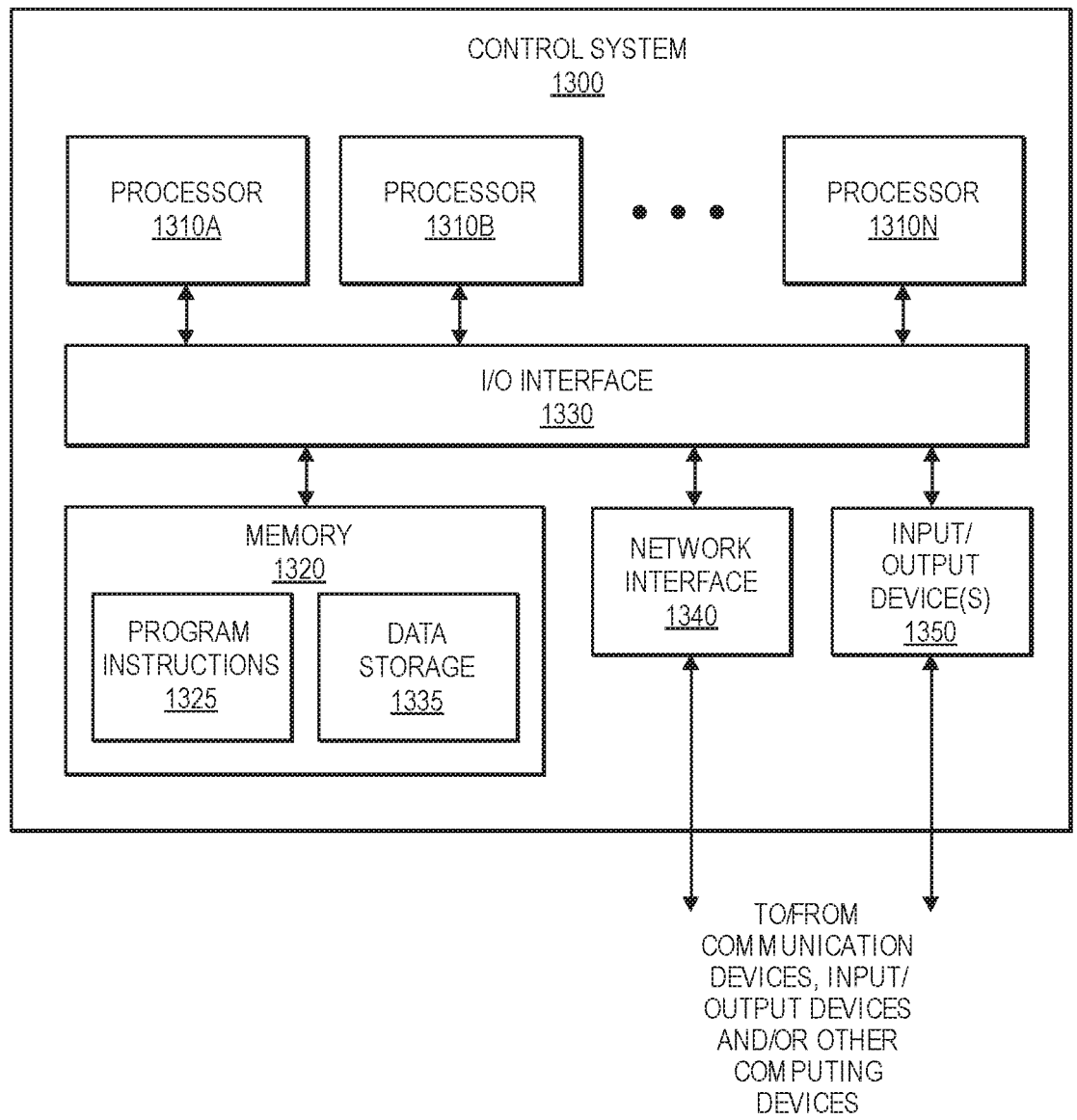
FIG. 13 is a block diagram illustrating various components of an example control system, in accordance with implementations of the present disclosure.

FIG. 13 is a block diagram illustrating various components of an example control system 1300, in accordance with implementations of the present disclosure.

Various operations of a control system or controller 1300, such as those described herein, may be executed on one or more computer systems, and/or interacting with various other computers, systems, or devices of a material handling facility, according to various implementations. For example, the control system or controller 1300 discussed above may function and operate on one or more computer systems. In the illustrated implementation, a control system 1300 includes one or more processors 1310A, 1310B through 1310N, coupled to a non-transitory computer-readable storage medium 1320 via an input/output (I/O) interface 1330. The control system 1300 further includes a network interface 1340 coupled to the I/O interface 1330, and one or more input/output devices 1350. In some implementations, it is contemplated that a described implementation may be implemented using a single instance of the control system 1300 while, in other implementations, multiple such systems or multiple nodes making up the control system 1300 may be configured to host different portions or instances of the described implementations. For example, in one implementation, some data sources or services (e.g., related to portions of the material handling facility systems, operations, or processes, etc.) may be implemented via one or more nodes of the control system 1300 that are distinct from those nodes implementing other data sources or services (e.g., related to other portions of the material handling facility systems, operations, or processes, etc.).

In various implementations, the control system 1300 may be a uniprocessor system including one processor 1310A, or a multiprocessor system including several processors 1310A - 1310N (e.g., two, four, eight, or another suitable number). The processors 1310A - 1310N may be any suitable processor capable of executing instructions. For example, in various implementations, the processors 1310A - 1310N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1310A - 1310N may commonly, but not necessarily, implement the same ISA.

The non-transitory computer-readable storage medium 1320 may be configured to store executable instructions and/or data accessible by the one or more processors 1310A - 1310N. In various implementations, the non-transitory computer-readable storage medium 1320 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1320 as program instructions 1325 and data storage 1335, respectively. In other implementations, program instructions and/or data may be received, sent or stored upon different types of computer-accessible media, such as non-transitory media, or on similar media separate from the non-transitory computer-readable storage medium 1320 or the control system 1300. Generally speaking, a non-transitory, computer-readable storage medium may include storage media or memory media such as magnetic or optical media, e.g., disk or CD/DVD-ROM, coupled to the control system 1300 via the I/O interface 1330. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1340.

In one implementation, the I/O interface 1330 may be configured to coordinate I/O traffic between the processors 1310A - 1310N, the non-transitory computer-readable storage medium 1320, and any peripheral devices, including the network interface 1340 or other peripheral interfaces, such as input/output devices 1350. In some implementations, the I/O interface 1330 may perform any necessary protocol, timing or other data transformations to convert data signals from one component (e.g., non-transitory computer-readable storage medium 1320) into a format suitable for use by another component (e.g., processors 1310A - 1310N). In some implementations, the I/O interface 1330 may include support for devices attached through various types of peripheral buses, such as a variant of the Peripheral Component Interconnect (PCI) bus standard or the Universal Serial Bus (USB) standard, for example. In some implementations, the function of the I/O interface 1330 may be split into two or more separate components, such as a north bridge and a south bridge, for example. Also, in some implementations, some or all of the functionality of the I/O interface 1330, such as an interface to the non-transitory computer-readable storage medium 1320, may be incorporated directly into the processors 1310A - 1310N.

The network interface 1340 may be configured to allow data to be exchanged between the control system 1300 and other devices attached to a network, such as other computer systems, material handling system controllers, warehouse, retail, or facility management systems, control systems of drive units, processing stations, various types of sensors, upstream stations or processes, downstream stations or processes, other material handling systems or equipment, or between nodes of the control system 1300. In various implementations, the network interface 1340 may support communication via wired or wireless general data networks, such as any suitable type of Ethernet network.

Input/output devices 1350 may, in some implementations, include one or more displays, projection devices, visual input/output devices, audio input/output devices, keyboards, keypads, touchpads, scanning devices, imaging devices, sensors, photo eyes, proximity sensors, RFID readers, voice or optical recognition devices, various other sensors described herein, or any other devices suitable for entering or retrieving data by one or more control systems 1300. Multiple input/output devices 1350 may be present in the control system 1300 or may be distributed on various nodes of the control system 1300. In some implementations, similar input/output devices may be separate from the control system 1300 and may interact with one or more nodes of the control system 1300 through a wired or wireless connection, such as over the network interface 1340.

As shown in FIG. 13, the memory 1320 may include program instructions 1325 that may be configured to implement one or more of the described implementations and/or provide data storage 1335, which may comprise various tables, data stores and/or other data structures accessible by the program instructions 1325. The program instructions 1325 may include various executable instructions, programs, or applications to facilitate the various systems, operations, and processes described herein, such as processing station controllers, drivers, or applications, drive unit controllers, drivers, or applications, drive unit path and destination determination controllers, drivers, or applications, transport mechanism controllers, drivers, or applications, rotating carrier controllers, drivers, or applications, height adjustment mechanism controllers, drivers, or applications, conveyor section controllers, drivers, or applications, leveling mechanism controllers, drivers, or applications, sensor controllers, drivers, or applications, sensor data processing applications, material handling equipment controllers, drivers, or applications, etc. The data storage 1335 may include various data stores for maintaining data related to the various systems, operations, or processes described herein, such as drive unit data, drive mechanism data, lift mechanism data, path or destination data, position or location data, fiducial marker data, station data, transport mechanism data, rotating carrier data, height adjustment mechanism data, conveyor section data, leveling mechanism data, item, tray, or tote data, sensor data, and/or other data items.

Those skilled in the art will appreciate that the control system 1300 is merely illustrative and is not intended to limit the scope of implementations. In particular, the control system and devices may include any combination of hardware or software that can perform the indicated functions, including other control systems or controllers, computers, network devices, internet appliances, robotic devices, etc. The control system 1300 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10A-11B, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A mobile, rotatable, transport mechanism, comprising:
   a robotic drive unit;
   a base and a frame configured to be transported by the robotic drive unit;
   a rotating carrier rotatably coupled to the frame, the rotating carrier configured to be rotated between a vertical orientation and a horizontal orientation by an actuator;
   a plurality of conveyor sections coupled to the rotating carrier, individual conveyor sections configured to receive respective trays; and
   a linkage arm coupled to each of the plurality of conveyor sections, the linkage arm configured to maintain the plurality of conveyor sections in a substantially horizontally flat orientation during rotation of the rotating carrier.

2. The mobile, rotatable, transport mechanism of claim 1, wherein the robotic drive unit is configured to lift, move, and place the rotating carrier via engagement with the base.

3. The mobile, rotatable, transport mechanism of claim 1, wherein the actuator comprises at least one of a gear drive, a worm gear drive, a chain drive, or a belt drive configured to rotate the rotating carrier.

4. The mobile, rotatable, transport mechanism of claim 1, wherein in the vertical orientation of the rotating carrier, the individual conveyor sections are substantially vertically stacked relative to each other; and
   wherein in the horizontal orientation of the rotating carrier, the individual conveyor sections are substantially horizontally aligned with each other.

5. An apparatus, comprising:
   a frame configured to be movable within an environment;
   a rotating carrier rotatably coupled to the frame, the rotating carrier configured to be rotated between at least a substantially vertical orientation and a substantially horizontal orientation;
   an actuator operatively connected to the rotating carrier, the actuator configured to rotate the rotating carrier between at least the substantially vertical orientation and the substantially horizontal orientation; and
   at least two conveyor sections coupled to the rotating carrier, individual conveyor sections configured to receive respective objects.

6. The apparatus of claim 5, further comprising:
   a base to which the frame is coupled;
   wherein the frame is configured to be movable within the environment by a robotic drive unit that selectively engages with the base.

7. The apparatus of claim 5, wherein in the substantially vertical orientation of the rotating carrier, the individual conveyor sections are substantially vertically stacked relative to each other; and
   wherein in the substantially horizontal orientation of the rotating carrier, the individual conveyor sections are substantially horizontally aligned relative to each other.

8. The apparatus of claim 5, further comprising:
   a leveling mechanism coupled to the at least two conveyor sections, the leveling mechanism configured to maintain the at least two conveyor sections in a same relative orientation during rotation of the rotating carrier.

9. The apparatus of claim 8, wherein the leveling mechanism comprises at least one of a linkage arm, a gear, a chain, a pulley, or a belt coupled to each of the at least two conveyor sections.

10. The apparatus of claim 8, further comprising:
    an angle control actuator operatively connected to the leveling mechanism, the angle control actuator configured to selectively actuate the leveling mechanism to adjust respective angles of the at least two conveyor sections.

11. The apparatus of claim 5, wherein the individual conveyor sections include at least one of a belt, a roller, a transverse belt, or a transverse roller.

12. The apparatus of claim 5, wherein the individual conveyor sections include respective actuators that are independently actuatable.

13. The apparatus of claim 5, further comprising:
    a height adjustment mechanism coupled to the frame, the height adjustment mechanism configured to adjust a vertical height of the rotating carrier relative to the frame.

14. The apparatus of claim 5, further comprising:
    a nested rotating carrier rotatably coupled to the rotating carrier, the nested rotating carrier configured to be rotated relative to the rotating carrier; and
    at least two nested conveyor sections coupled to the nested rotating carrier, individual nested conveyor sections configured to receive respective objects.

15. A method, comprising:
    instructing a robotic drive unit to move a rotating carrier that is in a transport orientation to a transfer position, the rotating carrier rotatably coupled to a frame configured to be movable within an environment and including at least two conveyor sections configured to receive respective objects, and the transport orientation comprising a substantially vertical orientation of the rotating carrier;
    causing rotation, via an actuator operatively connected to the rotating carrier, of the rotating carrier to a transfer orientation at the transfer position, the transfer orientation comprising a substantially horizontal orientation of the rotating carrier; and
    causing transfer of an object between the transfer position and the at least two conveyor sections.

16. The method of claim 15, further comprising:
    causing adjustment, via a height adjustment mechanism, of a height of the rotating carrier to align the at least two conveyor sections and the transfer position during transfer of the object.

17. The method of claim 15, further comprising:
    causing adjustment, via a leveling mechanism, of respective angles of the at least two conveyor sections of the rotating carrier to align the at least two conveyor sections and the transfer position during transfer of the object;
    wherein the leveling mechanism is configured to maintain the at least two conveyor sections in a same relative orientation during rotation of the rotating carrier.

18. The method of claim 15, wherein instructing the robotic drive unit to move the rotating carrier further comprises:
    instructing the robotic drive unit to engage with a base associated with the rotating carrier, and to lift and move the rotating carrier via the base.

19. The method of claim 15, further comprising:
    causing rotation, via the actuator, of the rotating carrier to the transport orientation subsequent to transfer of the object.

* * * * *